(12) United States Patent
Tao et al.

(10) Patent No.: US 12,474,258 B2
(45) Date of Patent: Nov. 18, 2025

(54) SYSTEMS AND METHODS FOR COMPOUND CONCENTRATION SENSING IN FLUIDS

(71) Applicant: University of Maryland, College Park, College Park, MD (US)

(72) Inventors: Yang Tao, Potomac, MD (US); Chiao-Yi Wang, College Park, MD (US); Anjana Hevaganinge, Rockville, MD (US); Dongyi Wang, Fayetteville, AR (US); Mohamed Amr Ali, College Park, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 0 days.

(21) Appl. No.: 17/860,412

(22) Filed: Jul. 8, 2022

(65) Prior Publication Data

US 2023/0010416 A1    Jan. 12, 2023

Related U.S. Application Data

(60) Provisional application No. 63/219,701, filed on Jul. 8, 2021, provisional application No. 63/219,816, filed on Jul. 8, 2021.

(51) Int. Cl.
*G01N 21/3577* (2014.01)
*G01J 3/10* (2006.01)
(Continued)

(52) U.S. Cl.
CPC ......... *G01N 21/3577* (2013.01); *G01J 3/108* (2013.01); *G01J 3/2823* (2013.01);
(Continued)

(58) Field of Classification Search
CPC ............ G01N 21/3577; G01N 21/359; G01N 2201/126; G01N 21/05; G01N 2201/1296;
(Continued)

(56) References Cited

U.S. PATENT DOCUMENTS

2018/0031480 A1* 2/2018 Sinclair .............. G01N 21/6428
2022/0205905 A1* 6/2022 Rai .......................... G01N 33/04

OTHER PUBLICATIONS

Fan et al., Deep-Learning-Assisted multivariate curve resolution, Nov. 13, 2020, Journal of Chromatography, pp. 1-11 (Year: 2020).*
(Continued)

*Primary Examiner* — Carolyn Fin
(74) *Attorney, Agent, or Firm* — George Likourezos; Carter, DeLuca & Farrell LLP

(57) ABSTRACT

A non-contact system for the sensing the concentration of a compound includes a hyperspectral imaging device configured to capture a hyperspectral image of a fluid, a flow cell configured to enable the capturing of a hyperspectral image of a fluid, a process, and a memory. The memory includes instructions stored thereon which, when executed by the processor, cause the system to generate a hyperspectral image of the fluid in the flow cell, generate several spectral signals based on the hyperspectral image, provide the spectral signal as an input to a machine learning network, and predict by the machine learning network the concentration of a compound in a fluid.

17 Claims, 23 Drawing Sheets

(51) Int. Cl.
    *G01J 3/28*     (2006.01)
    *G01N 21/359*     (2014.01)

(52) U.S. Cl.
    CPC .... *G01N 21/359* (2013.01); *G01J 2003/2843* (2013.01); *G01N 2201/126* (2013.01)

(58) Field of Classification Search
    CPC .. G01J 3/108; G01J 3/2823; G01J 2003/2843; G01J 2003/283; G01J 2003/2833; G01J 2003/2836; G01J 2003/284; G01J 3/0264; G01J 2003/2826
    See application file for complete search history.

(56) References Cited

OTHER PUBLICATIONS

Galindo Prieto et al., Classification in hyperspectral images by independent component analysis, segmented cross-validation and uncertainty estimates, Feb. 25, 2018, , J. Spectral Imaging, vol. 7, pp. 1-10 (Year: 2018).*

Ghaffari et al., Essential Spectral Pixels for Multivariate Curve Resolution of Chemical Images, Jul. 30, 2019, Anal. Chem., vol. 91, pp. 10943-10948 (Year: 2019).*

Villena Gonzales, et al., "The progress of glucose monitoring—A review of invasive to minimally and non-invasive techniques, devices and sensors", Sensors 19, pp. 1-45, 2019.

Kozma, B. et al., "On-line prediction of the glucose concentration of CHO cell cultivations by NIR and Raman spectroscopy: comparative scalability test with a shake flask model system", Journal of Pharmaceutical and Biomedical Analysis, 145, pp. 346-355, 2017.

Klonoff, D.C., "Continuous glucose monitoring, Roadmap for 21st century diabetes therapy", Diabetes care, 28(5), pp. 1231-1239, 2005.

Yoo, Eun-Hyung, et al., "Glucose biosensors: an overview of use in clinical practice", Sensors 10.5, pp. 4558-4576, 2010.

Qiu, Jiang, et al., "On-line near infrared bioreactor monitoring of cell density and concentrations of glucose and lactate during insect cell cultivation", Journal of Biotechnology, 173, pp. 106-111, 2014.

Rondonuwu, F.S., et al., "Determination of glucose concentration in aqueous solution using FT NIR spectroscopy", Journal of Physics: Conference Series, vol. 1307, No. 1, IOP Publishing, pp. 1-7, 2019.

Mekonnen, Bitewulign Kassa, et al. "Accurate prediction of glucose concentration and identification of major contributing features from hardly distinguishable near-infrared spectroscopy", Biomedical Signal Processing and Control 59, pp. 1-15, 2020.

Abu-Absi, Nicholas R., et al. "Real time monitoring of multiple parameters in mammalian cell culture bioreactors using an in-line Raman spectroscopy probe", Biotechnology and bioengineering, vol. 108, No. 5, pp. 1215-1221, 2011.

Lu, Guolan, et al., "Medical hyperspectral imaging: a review", Journal of biomedical optics, 19.1, pp. 1-24, 2014.

Baiano, Antonietta, "Applications of hyperspectral imaging for quality assessment of liquid based and semi-liquid food products: a review", Journal of Food Engineering, 214, pp. 1-15, 2017.

M. Manley, "Near-infrared spectroscopy and hyperspectral imaging: non-destructive analysis of biological materials", Chem Soc Rev, pp. 1-15, Feb. 5, 2014.

K. Thyholt, et al, "Near infrared spectroscopy of dry extracts from high moisture food products on solid support—a review", J. Near Infrared Spectrosc, 5, pp. 179-193, 1997.

Herve Abdi, "Partial Least Square Regression PLS-Regression", Academis, pp. 1-14, 2007.

Dusan Kojic, et al., "Water Confined in the Local Field of Ions" ChemPhysChem 15, 4077-4086, pp. 1-10, (2014).

Dongyi Wang, et al. "Early Detection of Tomato Spotted Wilt Virus by Hyperspectral Imaging and Outlier Removal Auxiliary Classifier Generative Adversarial Nets" (OR-AC-GAN). Scientific Reports, 9, pp. 1-14, (2019).

Dusan Kojic, et al., "Improving accuracy and reproducibility of vibrational spectra for diluted solutions" Analytica Chimica Acta 955, pp. 86-97 (2017).

Asmund Rinnan, et al., "Review of the most common preprocessing techniques for near-infrared spectra", Trends in Analytical Chemistry vol. 28, pp. 1201-1222, (2009).

Karen A. Esmonde-White, et al., "The role of Raman spectroscopy in biopharmaceuticals from development to manufacturing", Analytical and Bioanalytical Chemistry, pp. 1-23, (2021).

Jens Claßen, et al., "Spectroscopic sensors for in-line bioprocess monitoring in research and pharmaceutical industrial application", Anal Bioanal Chem., pp. 1-16, 2017.

\* cited by examiner

SYSTEMS AND METHODS FOR COMPOUND CONCENTRATION SENSING IN FLUIDS

CROSS-REFERENCE TO RELATED APPLICATION/CLAIM OF PRIORITY

This application is related to application U.S. patent application Ser. No. 17/860,428, entitled: "SYSTEMS AND METHODS FOR PH SENSING IN FLUIDS" filed Jul. 8, 2022, and claims the benefit of, and priority to, U.S. Provisional Patent Application No. 63/219,701 filed on Jul. 8, 2021. This application also claims the benefit of, and priority to, U.S. Provisional Patent Application No. 63/219,816 filed on Jul. 8, 2021. The entire contents of each of which are hereby incorporated herein by reference.

GOVERNMENT SUPPORT

This invention was made with government support under 70NANB17H002 awarded by the National Institute of Standards and Technology (NIST). The government has certain rights in the invention.

TECHNICAL FIELD

The present disclosure relates generally to the field of sensing the concentration of a compound in fluids. More specifically, an aspect of the present disclosure provides systems and methods for contactless sensing of the concentration of compounds in bioreactor fluids.

BACKGROUND

Compound concentrations are a crucial parameter in biological, physiological, and chemical domains. Monitoring and controlling glucose concentration, for example, is important in many applications, such as clinical blood glucose measurement and bioreactor cultivation. Continuously monitoring blood glucose is also meaningful for diabetes patients, which can help to determine the insulin uptake amount. Moreover, glucose is a general supplement in cell culture, which further shows the importance of developing innovative tools to control and monitor glucose concentration. However, near-infrared spectroscopy (NIRS) only provides a single point of spectral information of the sample, which can be easily affected by environmental noise. Thus, corresponding chemometric glucose determination models usually suffer from poor repeatability.

Accordingly, there is interest in sensing the concentration of compounds in fluids.

SUMMARY

An aspect of the present disclosure provides a non-contact system for sensing a concentration of a compound. The system includes a hyperspectral imaging device configured to capture a hyperspectral image of a fluid, a flow cell configured to enable the capturing of a hyperspectral image of a fluid, a processor, and a memory. The memory includes instructions stored thereon which, when executed by the processor, cause the system to generate a hyperspectral image of the fluid in the flow cell, generate a spectral signal based on the hyperspectral image, provide the spectral signal as an input to a machine learning network, and predict by the machine learning network the concentration of a compound in a fluid.

In an aspect of the present disclosure, the flow cell may be attached to a pump that is configured to pump a filtered fluid into the flow cell.

In another aspect of the present disclosure, the fluid may pass through a cell media filter prior to the fluid being flowed into the flow cell.

In yet another aspect of the present disclosure, the machine learning network may include a convolutional neural network.

In accordance with further aspects of the present disclosure, the flow cell may include a transparent window configured for imaging the fluid.

In an aspect of the present disclosure, the instructions, when executed by the processor, may further cause the system to preprocess the hyperspectral signal to reduce noise before providing the spectral signal to the machine learning network.

In another aspect of the present disclosure, the spectral signal may include pixels. The instructions, when executed by the processor, may further cause the system to compute an average of pixels in each column.

In yet another aspect of the present disclosure, the average of pixels in each column may be subtracted by an average of water signals from the identical column to serve as a reference correction.

In yet another aspect of the present disclosure, the instructions, when executed by the processor, may further cause the system to determine a relationship between the spectral signal and the concentration of the compound based on the ground truth of the concentration of the compound.

In aspects, the instructions, when executed by the processor, may further cause the system to validate the relationship by leave-one-concentration-out (LOCO) cross-validation.

An aspect of the present disclosure provides a computer-implemented method for sensing a concentration of a compound. The method includes capturing a hyperspectral image of a fluid within a flow cell by a hyperspectral imaging device, generating a spectral signal based on the hyperspectral image captured, providing the spectral signal as an input to a machine learning network, and predicting by the machine learning network the concentration of a compound in the fluid.

In an aspect of the present disclosure, the flow cell may be attached to a pump that is configured to pump a filtered fluid into the flow cell.

In another aspect of the present disclosure, the fluid may pass through a cell media filter prior to the fluid being flowed through the flow cell.

In yet another aspect of the present disclosure, the machine learning network may include a convolutional neural network.

In accordance with further aspects of the present disclosure, the flow cell may include a transparent window configured for imaging the fluid.

In an aspect of the present disclosure, the method may further include preprocessing the spectral signal to reduce noise before providing the spectral signal to the machine learning network.

In another aspect of the present disclosure, the spectral signal may include pixels and may further cause the system to compute an average of pixels in each column.

In yet another aspect of the present disclosure, a column average of glucose signals may be subtracted by an average of water signals from the identical column as a reference correction.

In yet another aspect of the present disclosure, the computer-implemented method may further include determining a relationship between the spectral signal and the concentration of the compound based on a ground truth of the concentration of the compound.

An aspect of the present disclosure provides a non-transitory computer-readable medium storing instructions for executing a method for sensing a concentration of a compound. The method includes generating a hyperspectral image of a fluid within a flow cell by a hyperspectral imaging device, generating a spectral signal based on the hyperspectral image captured, providing the spectral signal as an input to a machine learning network, and predicting by the machine learning network the concentration of a compound in the fluid.

Further details and aspects of the present disclosure are described in more detail below with reference to the appended drawings.

BRIEF DESCRIPTION OF THE DRAWINGS

A better understanding of the features and advantages of the present disclosure will be obtained by reference to the following detailed description that sets forth illustrative aspects, in which the principles of the present disclosure are utilized, and the accompanying drawings of which.

DETAILED DESCRIPTION

Figure 1:
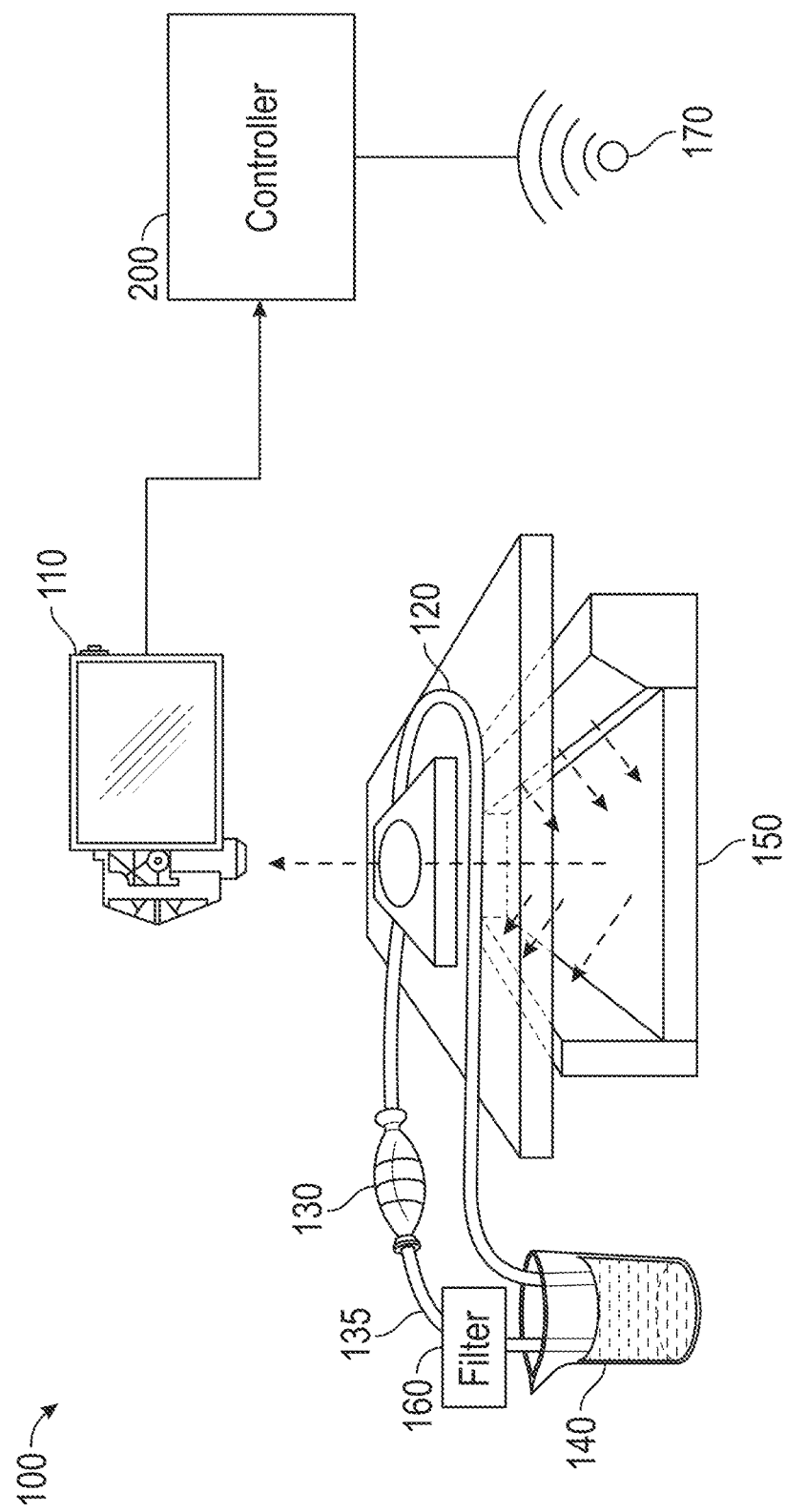
FIG. 1 is a diagram of a non-contact system for sensing a concentration of a compound, in accordance with aspects of the disclosure.

The present disclosure relates generally to the field of sensing the concentration of a compound in fluids. More specifically, an aspect of the present disclosure provides systems and methods for sensing the concentration of a compound in bioreactor fluids. As used herein, the term sensing also includes, but is not limited to detecting, determining, measuring, and/or predicting.

Aspects of the present disclosure are described in detail with reference to the drawings wherein like reference numerals identify similar or identical elements.

Although the present disclosure will be described in terms of specific aspects and examples, it will be readily apparent to those skilled in this art that various modifications, rearrangements, and substitutions may be made without departing from the spirit of the present disclosure. The scope of the present disclosure is defined by the claims appended hereto.

For purposes of promoting an understanding of the principles of the present disclosure, reference will now be made to exemplary aspects illustrated in the drawings, and specific language will be used to describe the same. It will nevertheless be understood that no limitation of the scope of the present disclosure is thereby intended. Any alterations and further modifications of the novel features illustrated herein and any additional applications of the principles of the present disclosure as illustrated herein, which would occur to one skilled in the relevant art and having possession of this disclosure, are to be considered within the scope of the present disclosure.

Referring to FIG. 1, a system 100 for compound concentration sensing is shown. The system 100 is configured to sense the concentration of a compound in a fluid. The compound may include, for example, glucose, amino acids, or any other organic compound that absorbs infrared light. The system 100 generally includes a hyperspectral imaging device 110 configured to capture a hyperspectral image of a fluid, a flow cell 120, and a controller 200. The system 100 may be used as a touchless compound concentration sensor for bioreactor fluids using the hyperspectral imaging device 110 and deep learning methods for spectra analysis and compound concentration prediction. A benefit of a touchless system is that the system can avoid cross-contamination from probes. The system 100 leverages the efficient spectral acquisition capabilities of the hyperspectral imaging device 110 to train and evaluate a machine learning network (e.g., 1D convolutional neural network (CNN) deep networks) for precise compound concentration prediction in cell media. An aspect of the present disclosure is an online compound concentration sensor configured for precise automated monitoring of cell culture in bioreactors. Although bioreactor fluids are discussed, the disclosed technology may be used to determine the concentration of a compound in any fluid.

The flow cell 120 is configured to enable the imaging of the fluid. The flow cell 120 may be completely transparent and/or may include a transparent window. A flow cell is a sample cell designed so that fluid samples may continuously flow through a beam path. New samples may be continually replenished such that continuous imaging is possible. In aspects, the flow cell 120 may be made of quartz or other transparent materials. In aspects, the flow cell may be an imaging cell, including micro cuvettes containing a compound solution and deionized water.

In aspects, the system 100 may further include a pump 130 (e.g., a peristaltic pump) configured to pump the fluid from a source (e.g., a bioreactor 140) to the flow cell 120. The pump 130 is configured to pump a fluid (i.e., cell media) into the flow cell 120. The system 100 may further include a cell media filter 160 configured to filter the cell media prior to the media being flowed into the flow cell 120. The pump 130 and/or cell media filter 160 may be connected to the flow cell 120 using tubing 135 (e.g., food-grade silicone tubing).

The hyperspectral imaging device 110 (e.g., a Short-Wave Infrared (SWIR) hyperspectral camera) is configured to capture a hyperspectral image of the fluid in the flow cell 120 and generate spectral signals based on the hyperspectral image. Hyperspectral imaging is a technique that analyzes a wide spectrum of light instead of just assigning primary colors (e.g., red, green, blue) to each pixel. The light striking each pixel is broken down into many different spectral bands in order to provide more information on what is imaged. In aspects, the hyperspectral imaging device 110 may use SWIR excitation.

The spectral signal includes SWIR spectra ranges from about 900 nm to about 2500 nm. The disclosed technology extracts the information from this range of spectra and finds a group of these wavelengths (i.e., signals) that are related to information or certain bands of signals of interest. In aspects, sample information may be obtained from the SWIR bands.

SWIR (about 900 nm-2500 nm) excitation strikes a healthy balance between sensitivity to water and water environment changes, including the addition of salts. Because lactic acid is a carboxylic acid, lactic acid forms a detectable signal in the SWIR range. These acids form a carboxylic acid cyclic dimer in solution through hydrogen bonding, which causes a spectral shift and broadening that is visible as a baseline shift in the spectra.

SWIR is ideally suited for: (1) determining the extent of solvent-solute hydrogen bonding in solution (this is a direct reflection of the concentration of ions present in solution and can be used as a measure of acid/base ion formation in solution, for example); and (2) determining the hydration of a substance through the shifts of prominent water peaks.

Each sample was prepared by weighing (e.g., by a balance scale) an appropriate amount of D-glucose (Sigma-Aldrich, G8270, >99.5%) dissolved in about 50 mL of deionized water. Each sample was shaken inside a centrifuge tube for about 10 seconds to ensure that the glucose was fully dissolved inside the sample. Images were collected by two technicians over about five days within three months to increase the randomness of the data and to ensure the model generalization capabilities.

The hyperspectral imaging device 110 may include a light source 150, such as a tungsten halogen light. The light source 150 may include a diffuser to more evenly distribute the light generated by the light source 150.

In aspects, the system 100 may also include a wireless transceiver 170 (e.g., Wi-Fi, and/or Bluetooth®) for wireless communication between the system 100 and the internet or another device (e.g., a laptop or a mobile device). For example, hyperspectral images may be communicated wirelessly to a user device.

Figure 2:
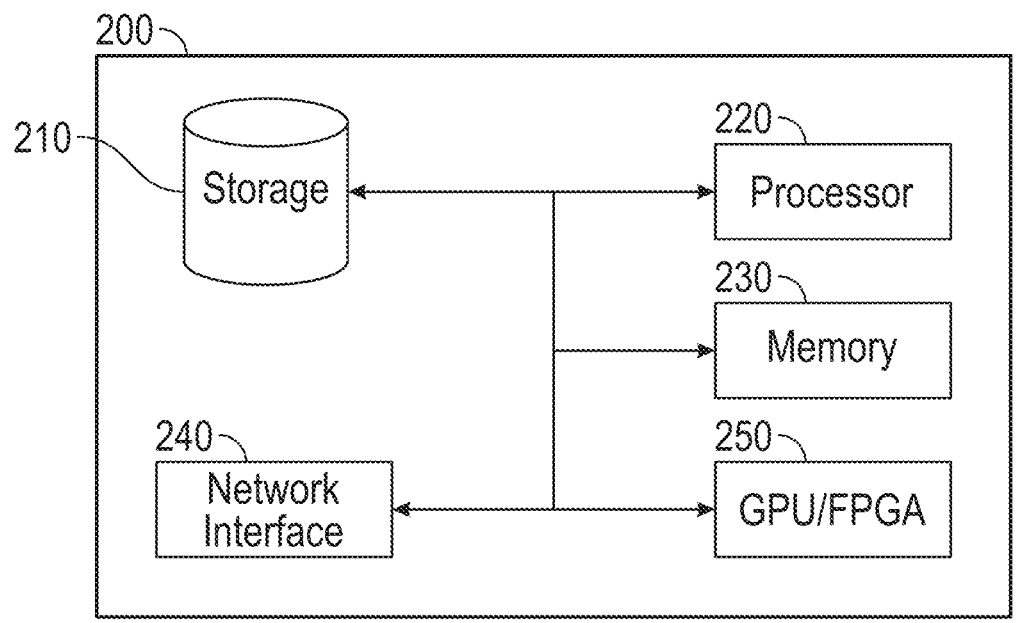
FIG. 2 is a block diagram of a controller configured for use with the system for detecting the compound concentration readings of FIG. 1, in accordance with aspects of the disclosure.

FIG. 2 illustrates controller 200 includes a processor 220 connected to a computer-readable storage medium or a memory 230. The controller 200 may be used to control and/or execute operations of the system 100. The computer-readable storage medium or memory 230 may be a volatile type of memory, e.g., RAM, or a non-volatile type of memory, e.g., flash media, disk media, etc. In various aspects of the disclosure, the processor 220 may be another type of processor, such as a digital signal processor, a microprocessor, an ASIC, a graphics processing unit (GPU), a field-programmable gate array (FPGA), or a central processing unit (CPU). In certain aspects of the disclosure, network inference may also be accomplished in systems that have weights implemented as memristors, chemically, or other inference calculations, as opposed to processors.

In aspects of the disclosure, the memory 230 can be random access memory, read-only memory, magnetic disk memory, solid-state memory, optical disc memory, and/or another type of memory. In some aspects of the disclosure, the memory 230 can be separate from the controller 200 and can communicate with the processor 220 through communication buses of a circuit board and/or through communication cables such as serial ATA cables or other types of cables. The memory 230 includes computer-readable instructions that are executable by the processor 220 to operate the controller 200. In other aspects of the disclosure, the controller 200 may include a network interface 240 to communicate with other computers or to a server. A storage device 210 may be used for storing data. The disclosed method may run on the controller 200 or on a user device, including, for example, on a mobile device, an IoT device, or a server system.

Figure 3:
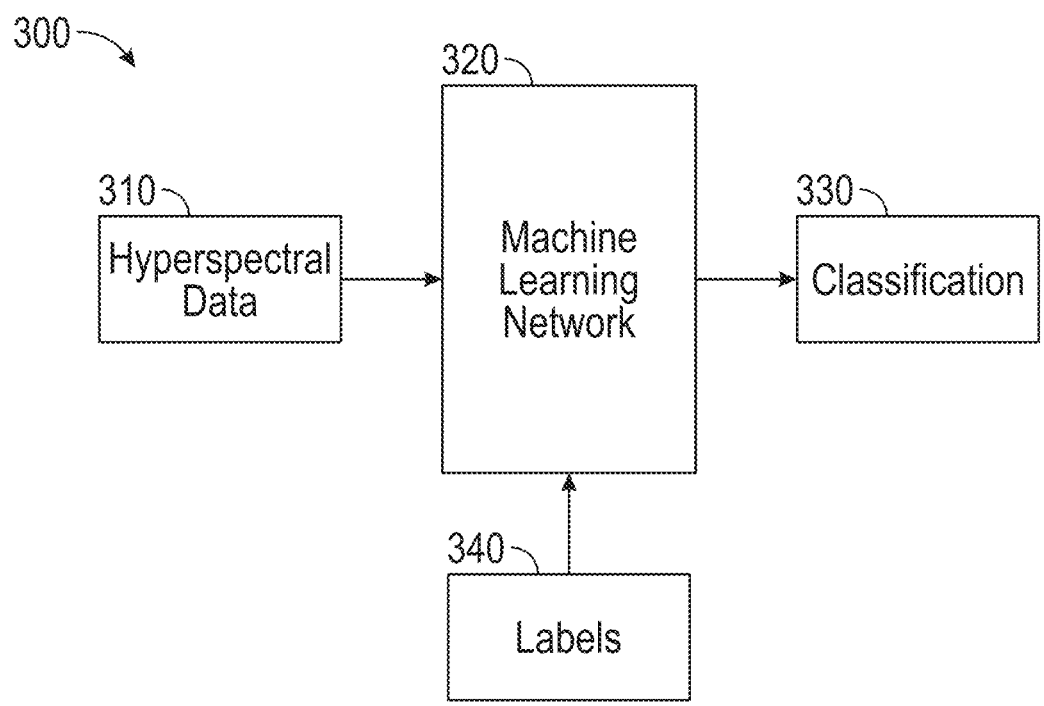
FIG. 3 is a block diagram of a machine learning network and inputs and outputs of a deep learning neural network, in accordance with aspects of the disclosure.

With reference to FIG. 3, a block diagram for a machine learning network 320 for classifying data in accordance with some aspects of the disclosure is shown. In some systems, a machine learning network 320 may include, for example, a convolutional neural network (CNN) and/or a recurrent neural network. A deep learning neural network includes multiple hidden layers. As explained in more detail below, the machine learning network 320 may leverage one or more classification models (e.g., CNNs, decision trees, Naïve Bayes, k-nearest neighbor) to classify data. The machine learning network 320 may be executed on the controller 200 (FIG. 2). Persons skilled in the art will understand the machine learning network 320 and how to implement it. The convolutional network may include a bottleneck layer which transforms the redundant spectral signals to a latent space in which the concentrations of various biological compounds is easily quantifiable using sparse polynomial regression.

In machine learning, a CNN is a class of artificial neural network (ANN), most commonly applied to analyzing visual imagery. The convolutional aspect of a CNN relates to applying matrix processing operations to localized portions of an image, and the results of those operations (which can involve dozens of different parallel and serial calculations) are sets of many features that are delivered to the next layer. A CNN typically includes convolution layers, activation function layers, deconvolution layers (e.g., in segmentation networks), and/or pooling (typically max pooling) layers to reduce dimensionality without losing too many features. Additional information may be included in the operations that generate these features. Providing unique information that yields features that give the neural networks information can be used to provide an aggregate way to differentiate between different data input to the neural networks.

Figure 4:
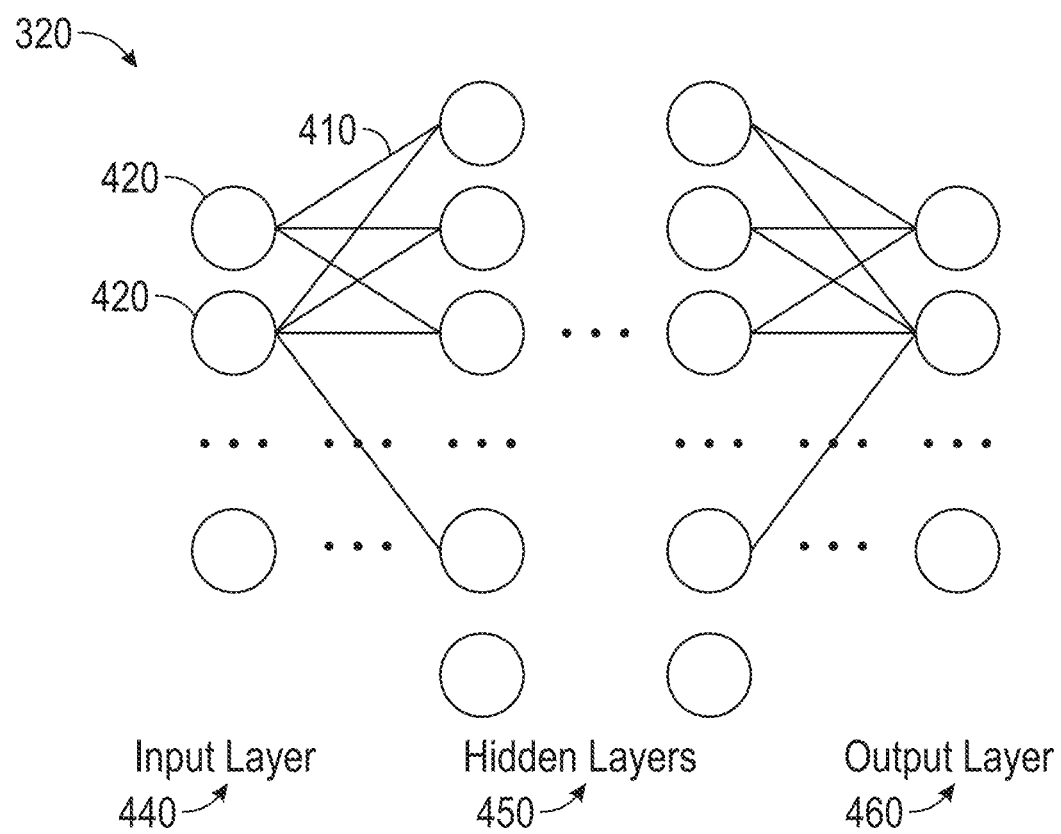
FIG. 4 is a diagram of layers of the deep learning neural network of FIG. 3 in accordance with aspects of the disclosure.
Figure 5A:
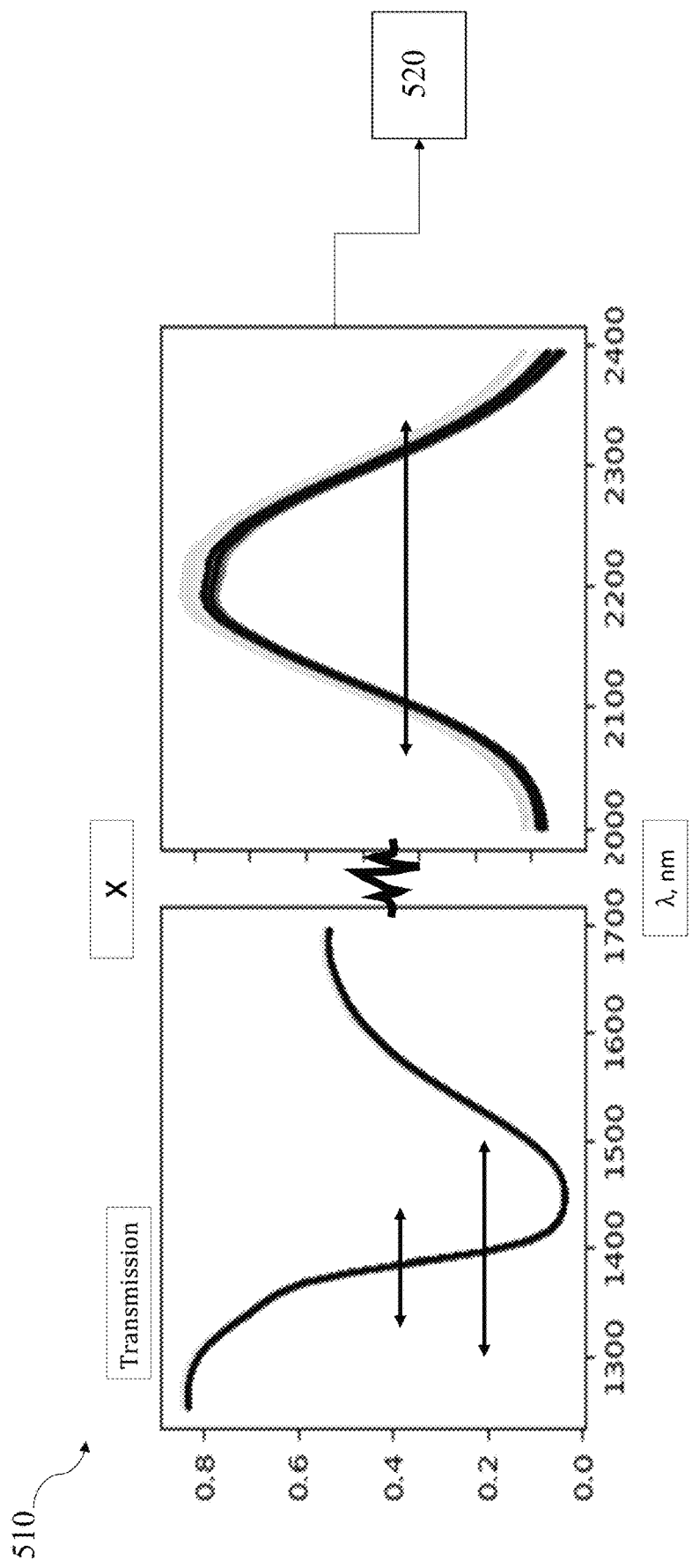
FIG. 5A illustrates a graphical representation of example transmission spectra to be used as inputs to the machine learning network, in accordance with aspects of the present disclosure.
Figure 5B:
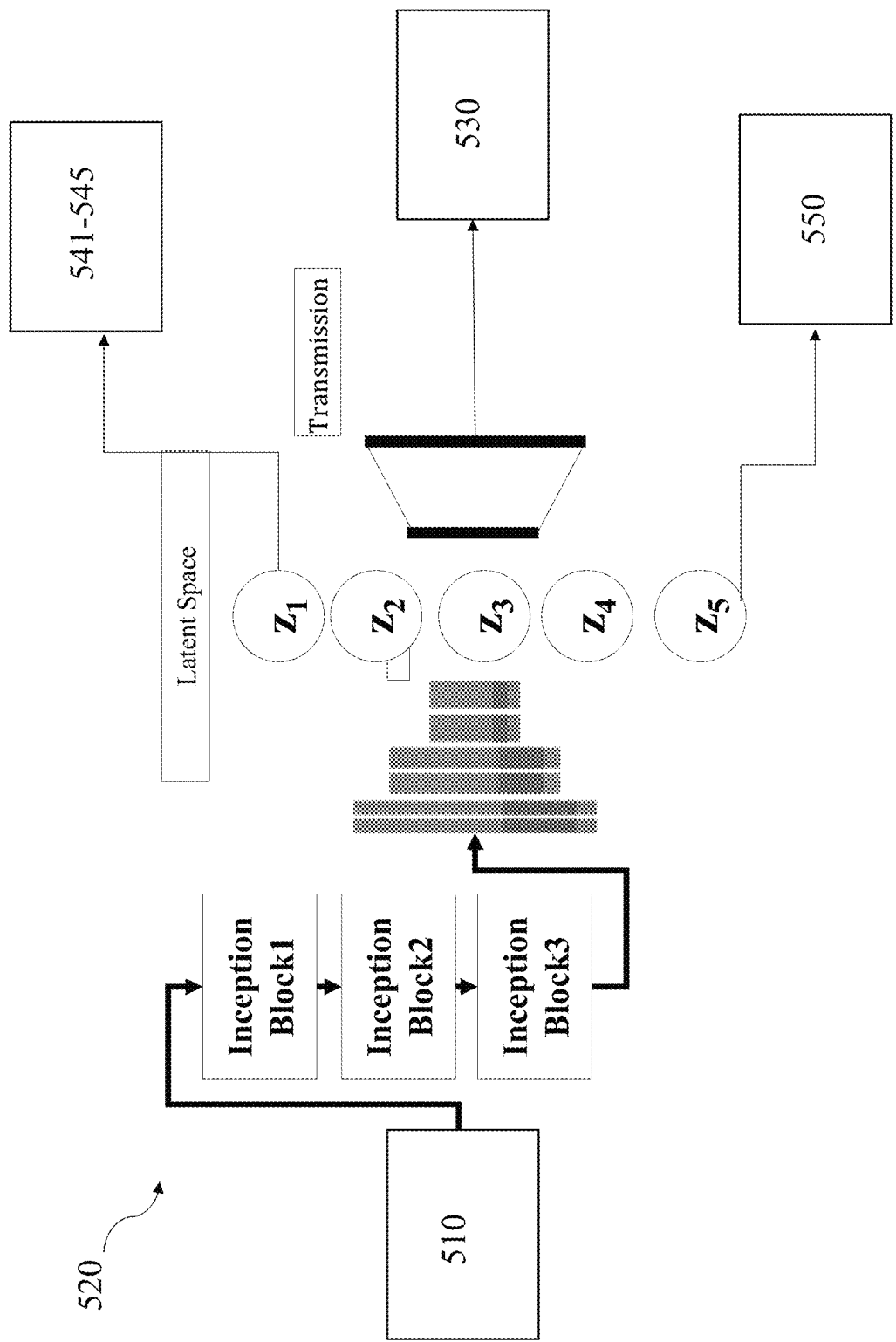
FIG. 5B is a diagram of layers of the deep learning neural network, in accordance with aspects of the disclosure.
Figure 5C:
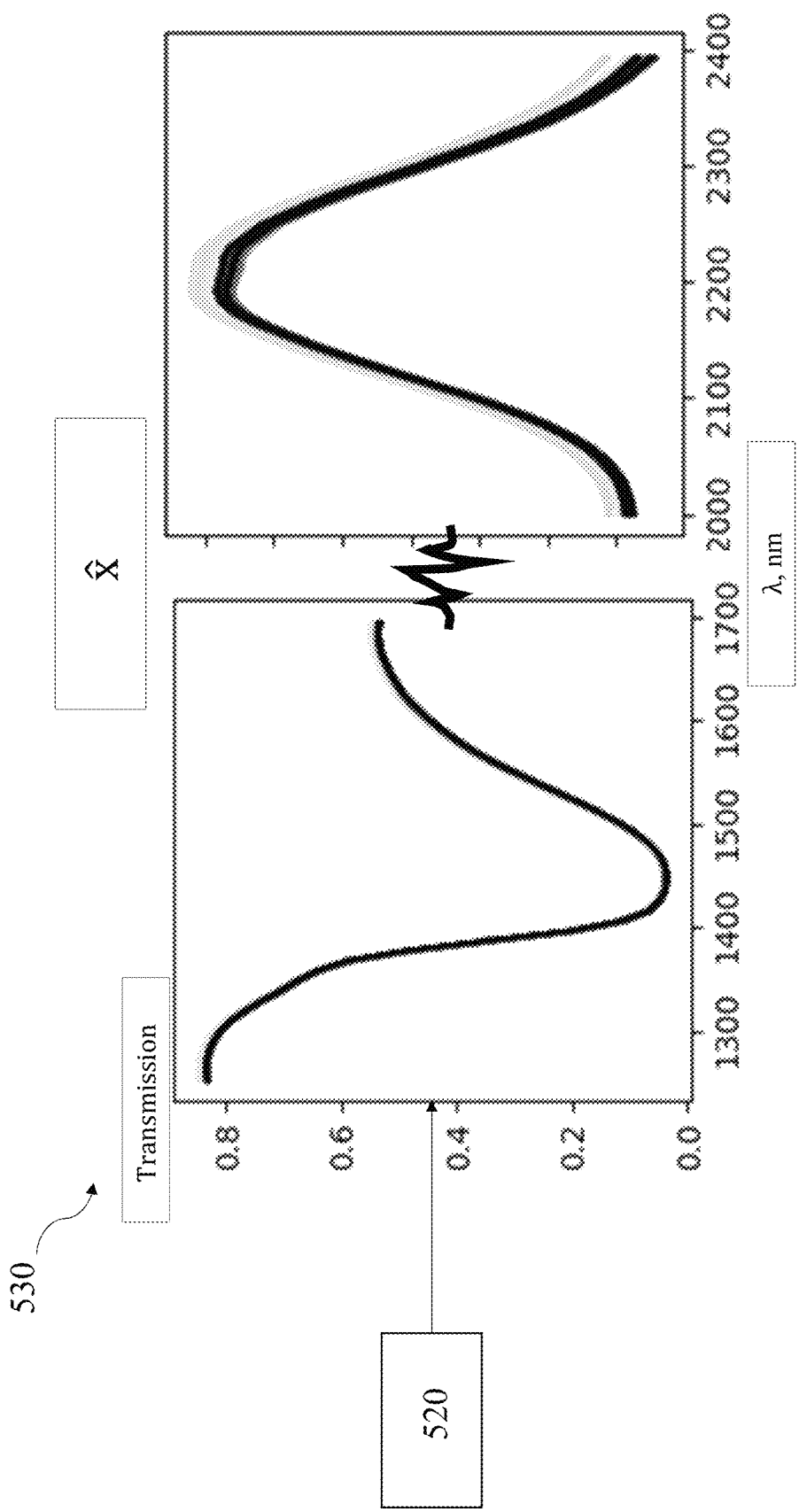
FIG. 5C illustrates the graphical representation of example transmission spectra, in accordance with aspects of the present disclosure.
Figure 5D:
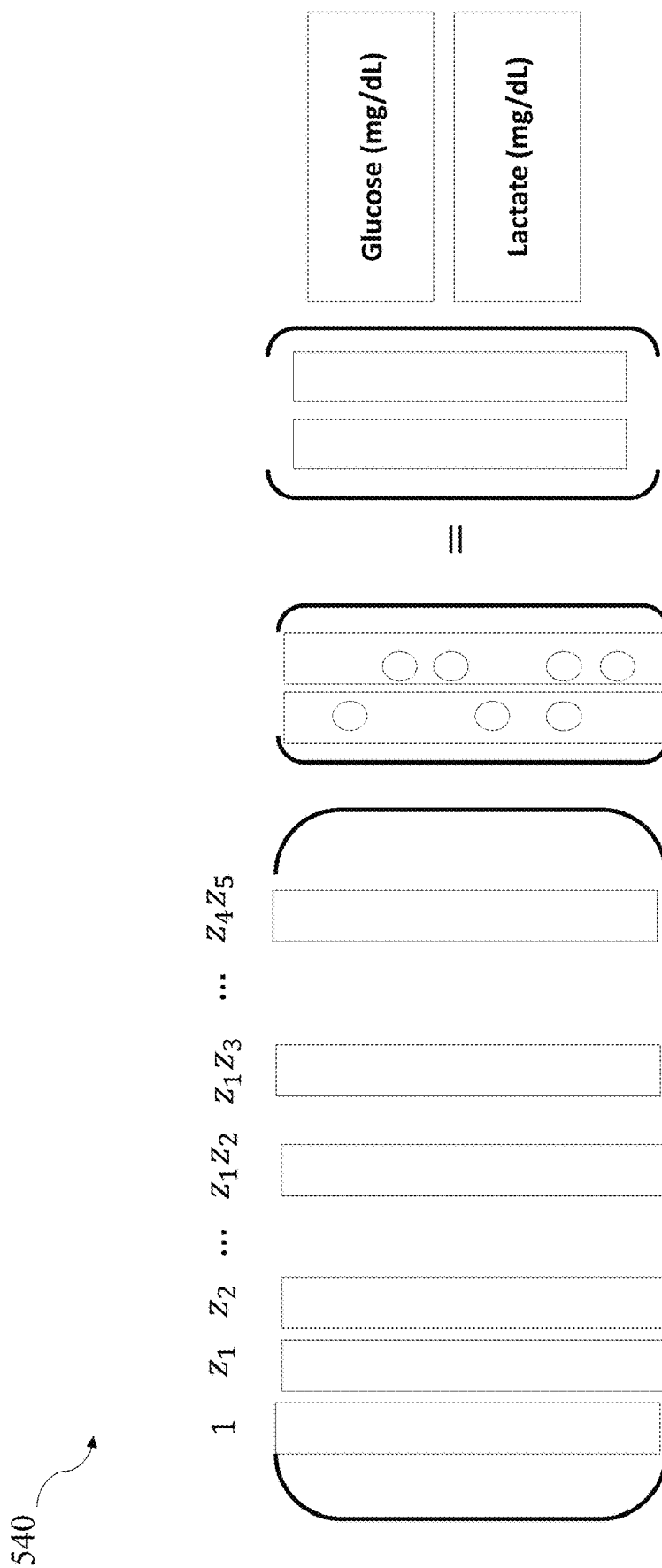
FIG. 5D illustrates a transmission matrix of the machine learning network of FIG. 5B, in accordance with aspects of the present disclosure.

Referring to FIG. 4, generally, a machine learning network 320 (e.g., a convolutional deep learning neural network) includes at least one input layer 440, a plurality of hidden layers 450, and at least one output layer 460. The input layer 440, the plurality of hidden layers 450, and the output layer 460 all include neurons 420 (e.g., nodes). The neurons 420 between the various layers are interconnected via weights 410. Each neuron 420 in the machine learning network 320 computes an output value by applying a specific function to the input values coming from the previous layer. The function that is applied to the input values is determined by a vector of weights 410 and a bias. Learning, in the deep learning neural network, progresses by making iterative adjustments to these biases and weights. The vector of weights 410 and the bias are called filters (e.g., kernels) and represent particular features of the input (e.g., a particular shape). The machine learning network 320 may output logits. Although CNNs are used as an example, other machine learning classifiers are contemplated.

The machine learning network 320 may be trained based on labeling training data to optimize weights. For example, samples of the bioreactor fluid may be taken and labeled using measured compound concentration values. In some methods in accordance with this disclosure, the training may include supervised learning or semi-supervised. Persons skilled in the art will understand training the machine learning network 320 and how to implement it.

FIGS. 5A-D illustrate the hyperspectral image being processed by the machine learning network 320. The resulting spectra from different cell environments are highly correlated, with nearly invisible shifts that correlate to compound differences. Thus, these spectra may be transformed into an easily separable compressed space using the machine learning network 320 (such as an autoencoder architecture) that enables the development of parsimonious regression models for compound quantification. Specifically, sparse polynomial regression models are fitted for compound quantification using the bottleneck layer. Glucose, lactate, and percent cell viability readings are quantified. The sparse polynomial regression models are easily interpreted using the sparse weights selected for each compound. The machine learning network 320 may predict the concentration of a compound such as glucose, lactate, and/or any compound/substance with a near-infrared signal.

Figure 6:
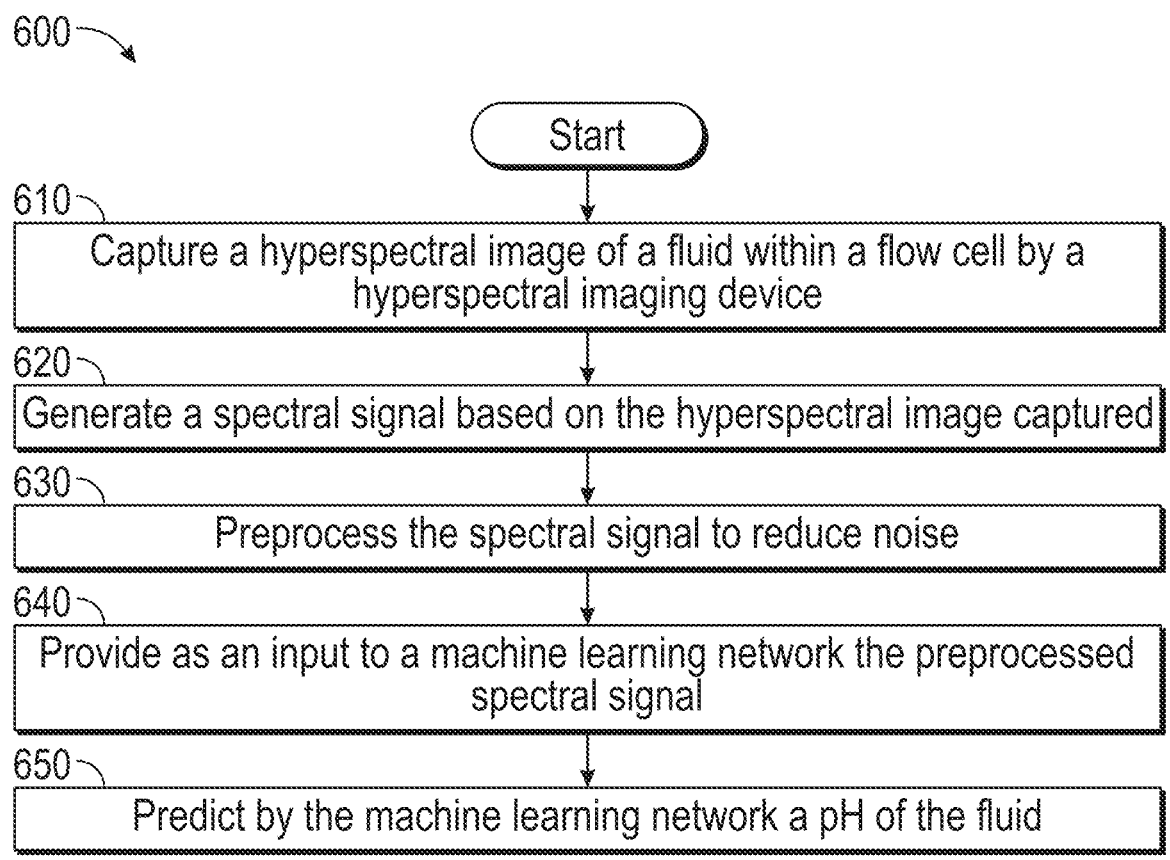
FIG. 6 is a flow diagram of a computer-implemented method for non-contact sensing of compound concentration, in accordance with aspects of the present disclosure.

Referring to FIG. 6, a flow diagram for a method in accordance with the present disclosure for detecting the concentration of a compound in bioreactor fluids is shown as 600. Although the steps of FIG. 6 are shown in a particular order, the steps need not all be performed in the specified order, and certain steps can be performed in another order. For example, FIG. 6 will be described below, with a controller 200 of FIG. 2 performing the operations. In aspects, the operations of FIG. 6 may be performed all or in part by another device, for example, a server, a mobile device, such as a smartphone, and/or a computer system. These variations are contemplated to be within the scope of the present disclosure.

Initially, at step 610, the controller 200 captures a hyperspectral image of a fluid within a flow cell 120 by a hyperspectral imaging device 110 (FIG. 1). The fluid may include a bioreactor fluid from a bioreactor 140. For example, a fluid may be pumped by the pump 130 from the bioreactor 140 to the flow cell 120 for imaging.

Next, at step 620, the controller 200 generates a spectral signal based on the captured hyperspectral image. The spectral signal may include thousands of SWIR spectra.

Next, at step 630, the controller 200 may preprocess the spectral signal, for example, by using reference correction. Wavelength regions from about 1100 to about 1800 nm may be used. Wavelength regions <about 1100 nm contain a low signal-to-noise ratio. The region around about 1900 nm has an unusually high $H_2O$ absorption. In aspects, the region of interest may be cropped either manually or automatically. For example, the regions below a threshold value (e.g., about 1100 nm) may be cropped. In aspects, the spectral signal may be preprocessed. For example the preprocessing may include filtering the spectral signal using pixel-wise averaged smoothing.

In aspects, the controller 200 may calculate a reference correction by subtracting a column average of glucose signals by an average of water signals from an identical column.

A variety of reference correction methods may be used for SWIR spectra, ranging from mean subtraction methods, baseline correction methods like Multiplicative Scatter Correction, and derivative-based smoothing methods like Savitzky-Golay derivation. Search and subtraction of the sample signal by the closest matching pure solvent signal is particularly revealing of subtle shifts in the SWIR spectra caused by hydrogen bonding interactions between the aqueous solvent and solute. For example, before each day's experiment, white and dark calibrations of the camera may be conducted. The dark calibration may be implemented with the camera shutter closed. The white calibration image may be acquired by letting the light shoot through the station glass directly. For each glucose sample, an identical micro cuvette filled with DI water may be put aside as the reference sample.

Next, at step 640, the controller 200 provides the spectral signal as an input to a machine learning network 320. In aspects, the spectral signal may be preprocessed. SWIR excitations are highly nonlinear. Therefore, modeling complex interactions between aqueous solvent and ionic solutes is quite difficult using quantum mechanics. Most existing chemometric methods assume the use of high spectral resolution instruments ($\Delta\lambda < 2$ nm) in order to detect subtle shifts in the water peak of the sample spectra. The hyperspectral imaging device 110 enables the collection of thousands of SWIR spectra from a single image taken within approximately a few milliseconds.

Next, at step 650, the controller 200 predicts by the machine learning network 320 the concentration of a compound in the fluid being flown through the flow cell. The predicted compound concentration may be displayed on a display. In aspects, the predicted compound concentration may be used to actuate a device to adjust the $CO_2$ of a bioreactor in response to the predicted compound concentration.

In aspects, the predicted concentration of the compound may be used to identify, for example, plastics, cell viability, monitoring cell growth, monitoring compounds of a bioreactor, and/or monitoring a patient's glucose.

Figure 7A:
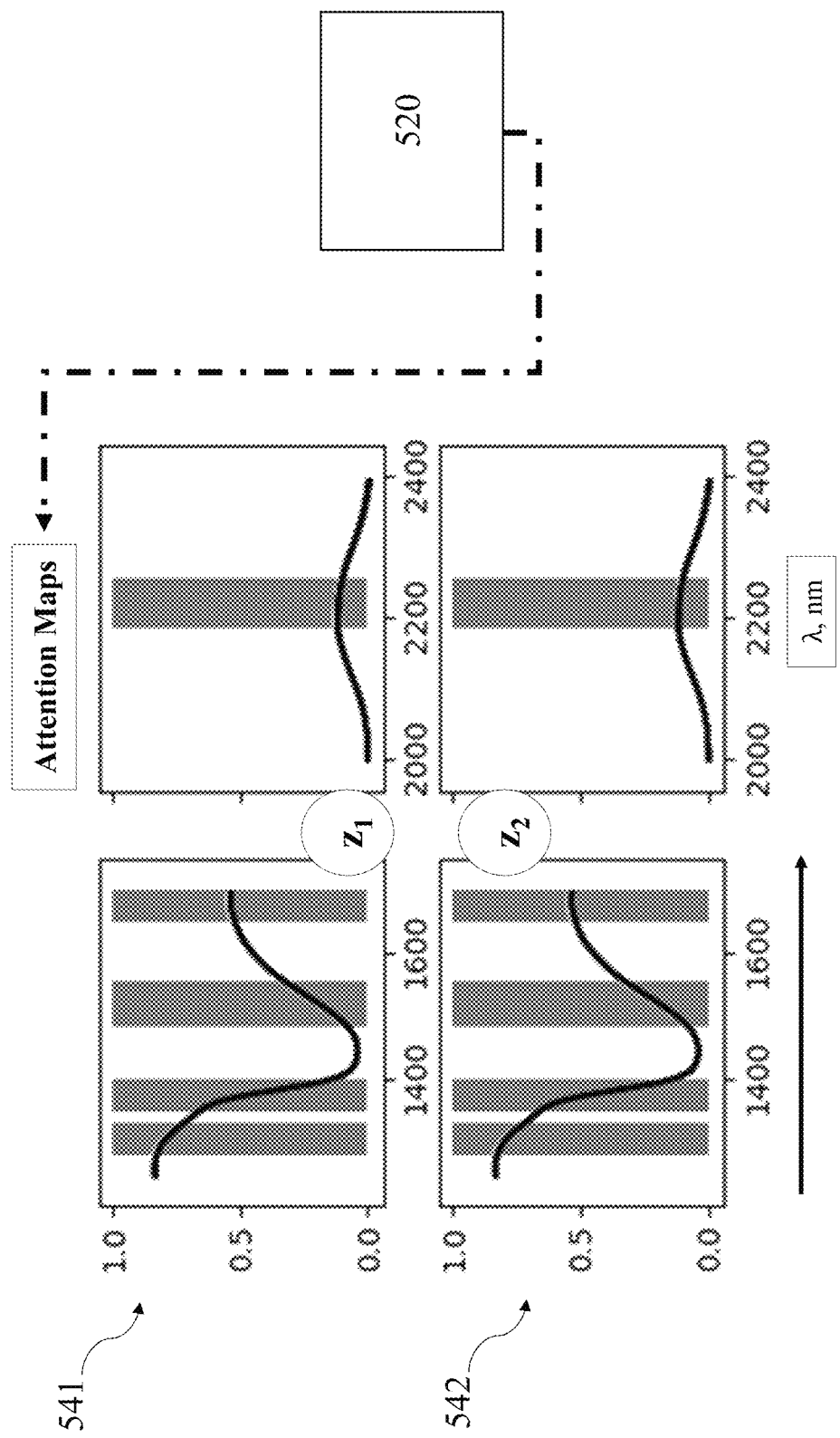
FIGS. 7A and 7B illustrate a flow diagram for a Switch-Map algorithm for analyzing the influence of various spectral bands on compound predictions, in accordance with aspects of the present disclosure.
Figure 7B:
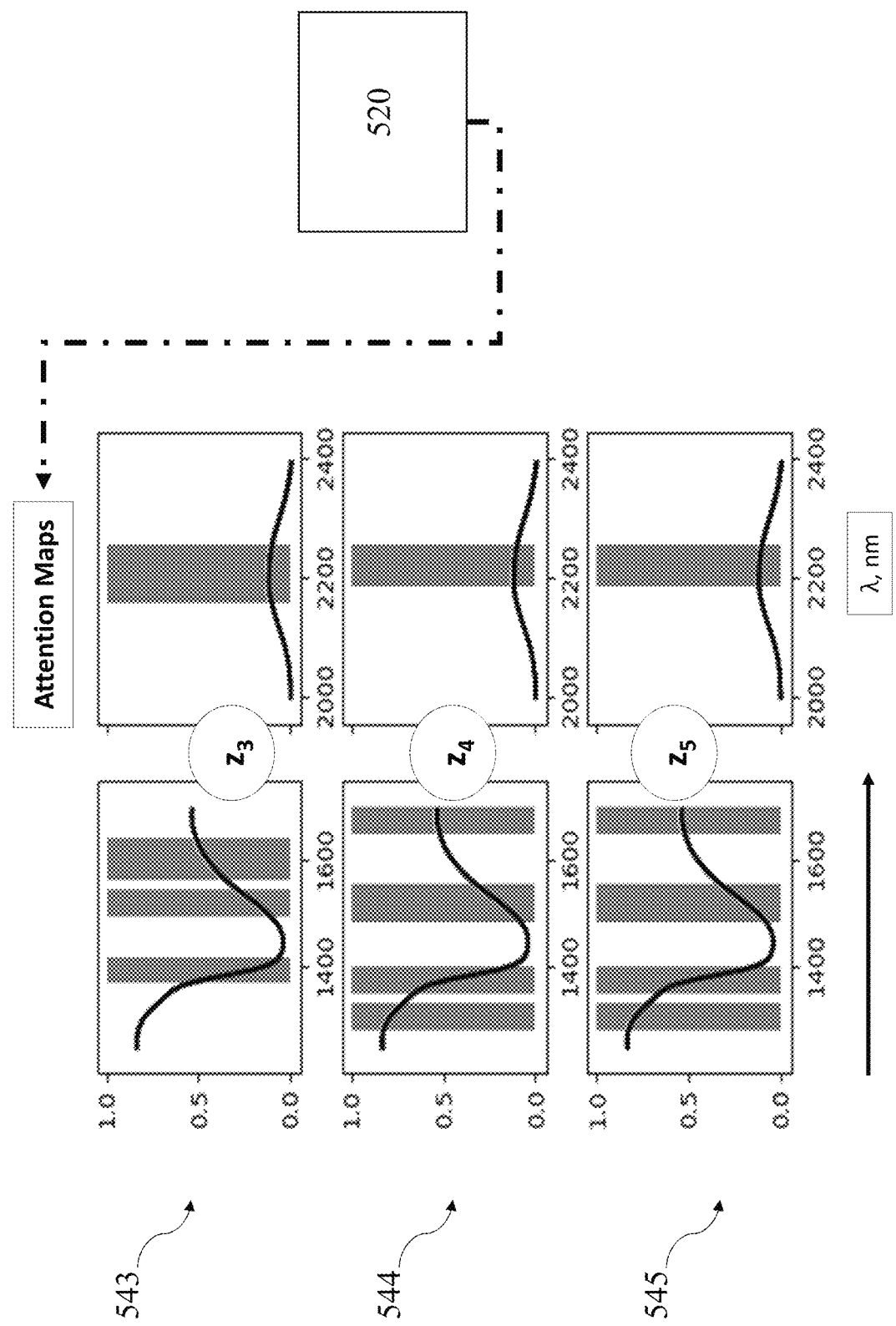
Figure 8:
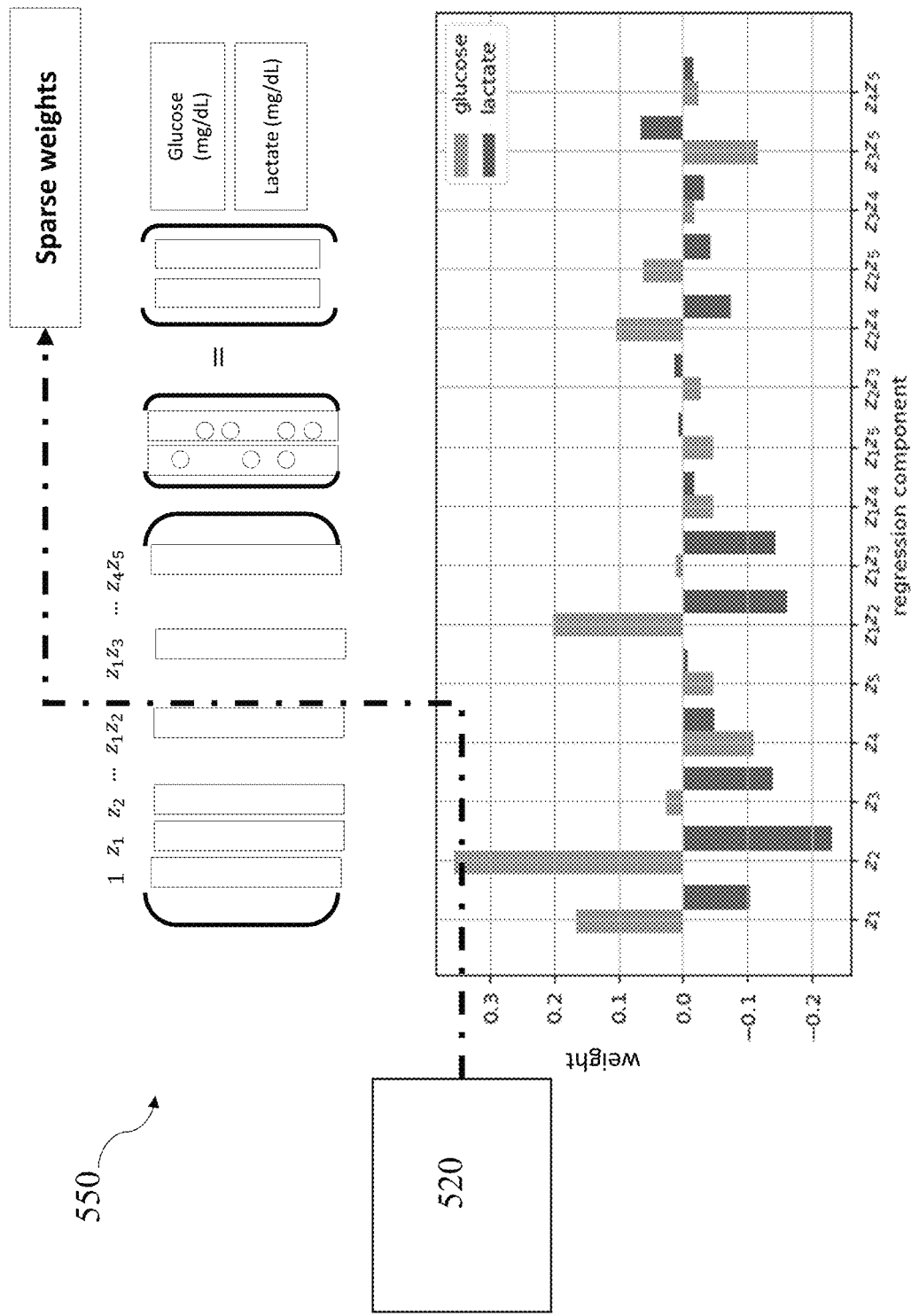
FIG. 8 is a graph illustrating sparse weights vs. regression components for the Switch-Map algorithm of FIGS. 7A and 7B, in accordance with aspects of the present disclosure.

Referring to FIGS. 7A, 7B, and 8, a flow diagram for a Switch-Map algorithm for analyzing the influence of various spectral bands on compound predictions is shown. FIGS. 7A and 7B illustrate feeding the hyperspectral images to an attention map that focuses on various spectral bands that influence compound prediction. An attention map is a scalar matrix representing the relative importance of layer activations at different 2D spatial locations with respect to the target task. This is used to assist in generating the sparse weights. The sparse weights vs. the regression components are illustrated in the graph in FIG. 8.

Figure 9:
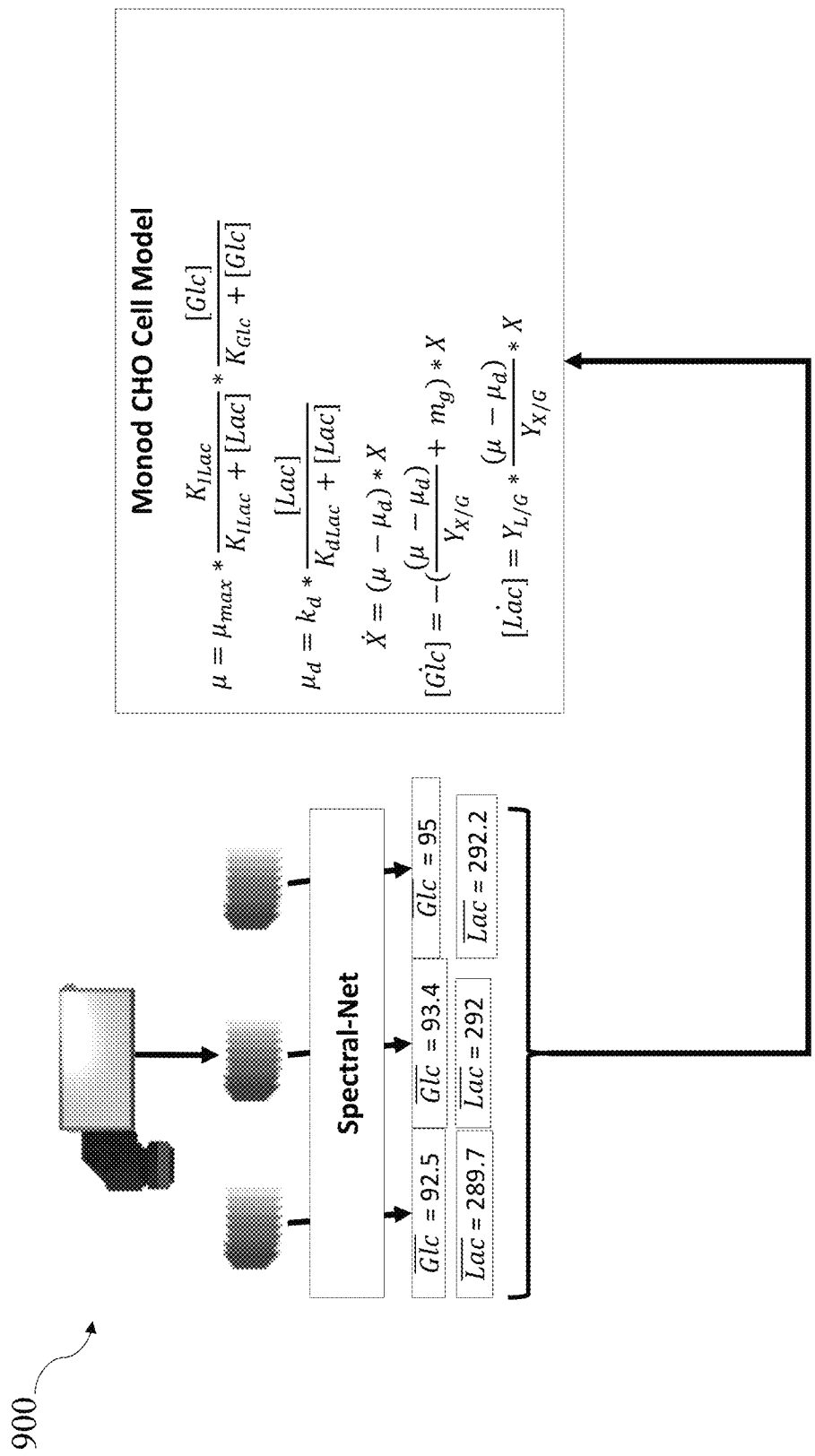
FIG. 9 illustrates a Monod kinetic filter used to extend predictions to unseen compound(s), in accordance with aspects of the present disclosure.

Referring to FIG. 9, a Monod kinetic filter is used to extend predictions to unseen compound(s). The Monod kinetic filter uses Monod kinetics to examine the growth rate of a compound as a function of concentration in the fluid.

Figure 10A:
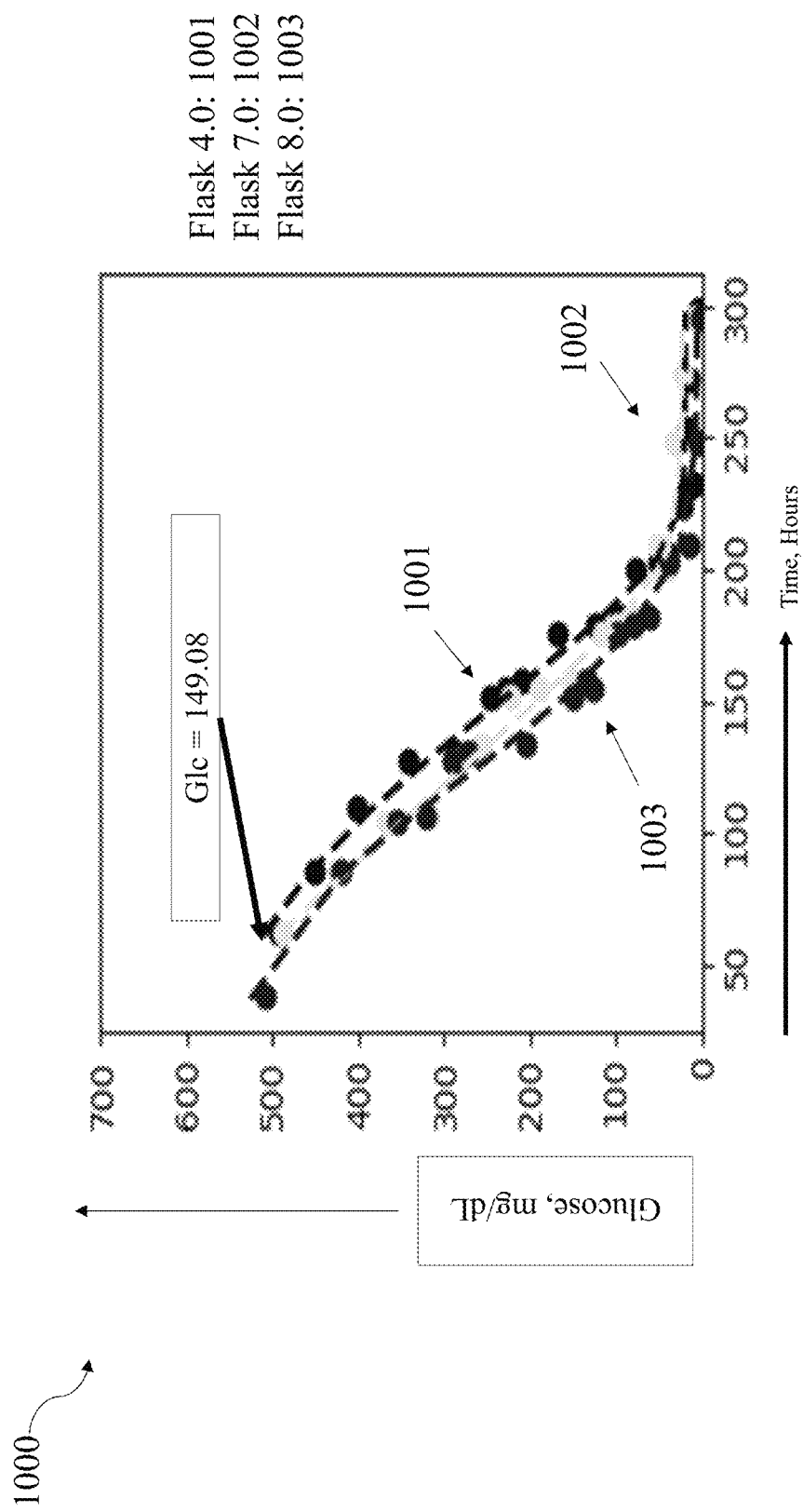
FIG. 10A is a graph illustrating glucose concentration vs. time for various samples, in accordance with aspects of the present disclosure.
Figure 10B:
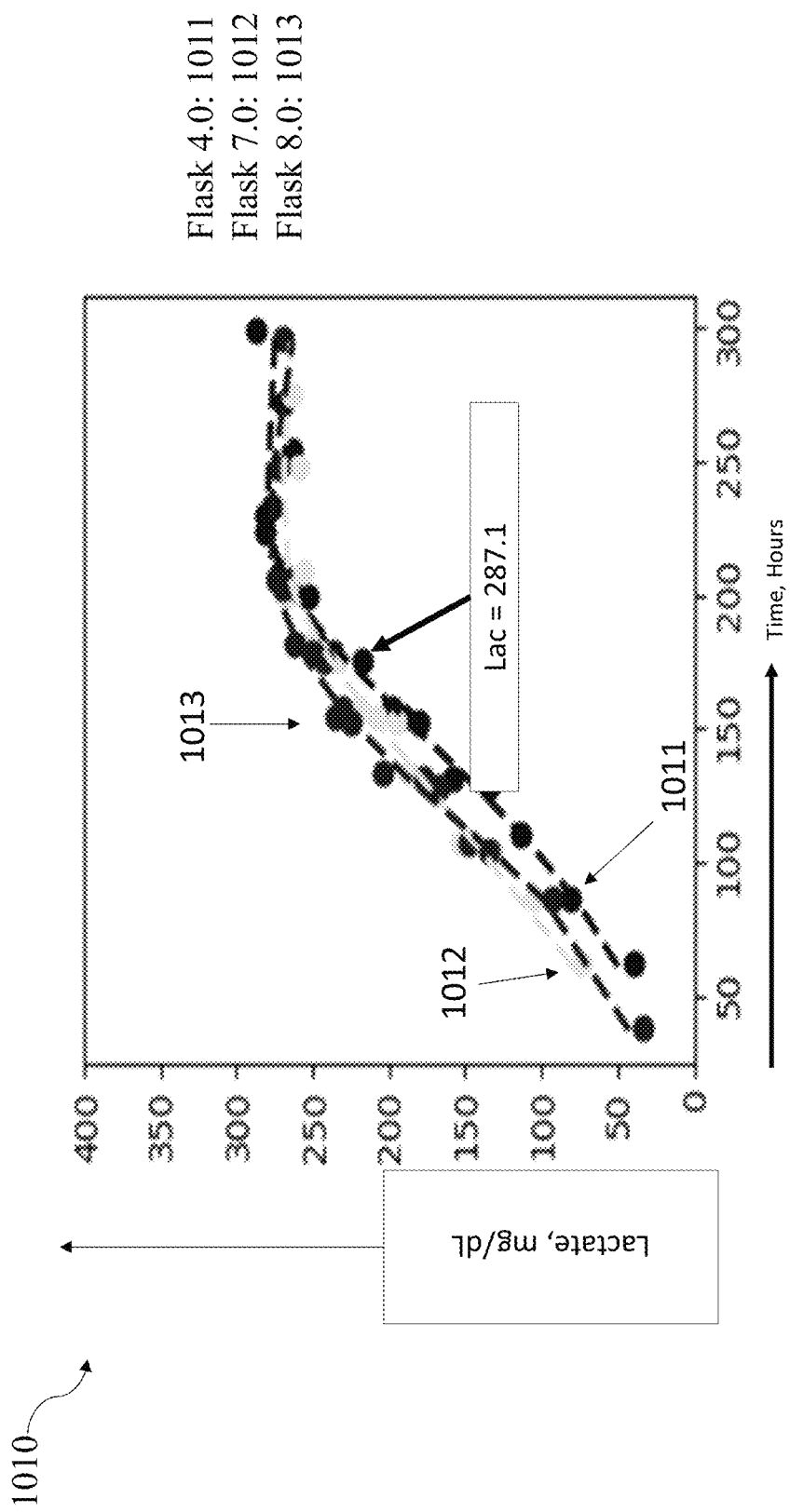
FIG. 10B is a graph illustrating lactate concentration vs. time for various samples, in accordance with aspects of the present disclosure.
Figure 10C:
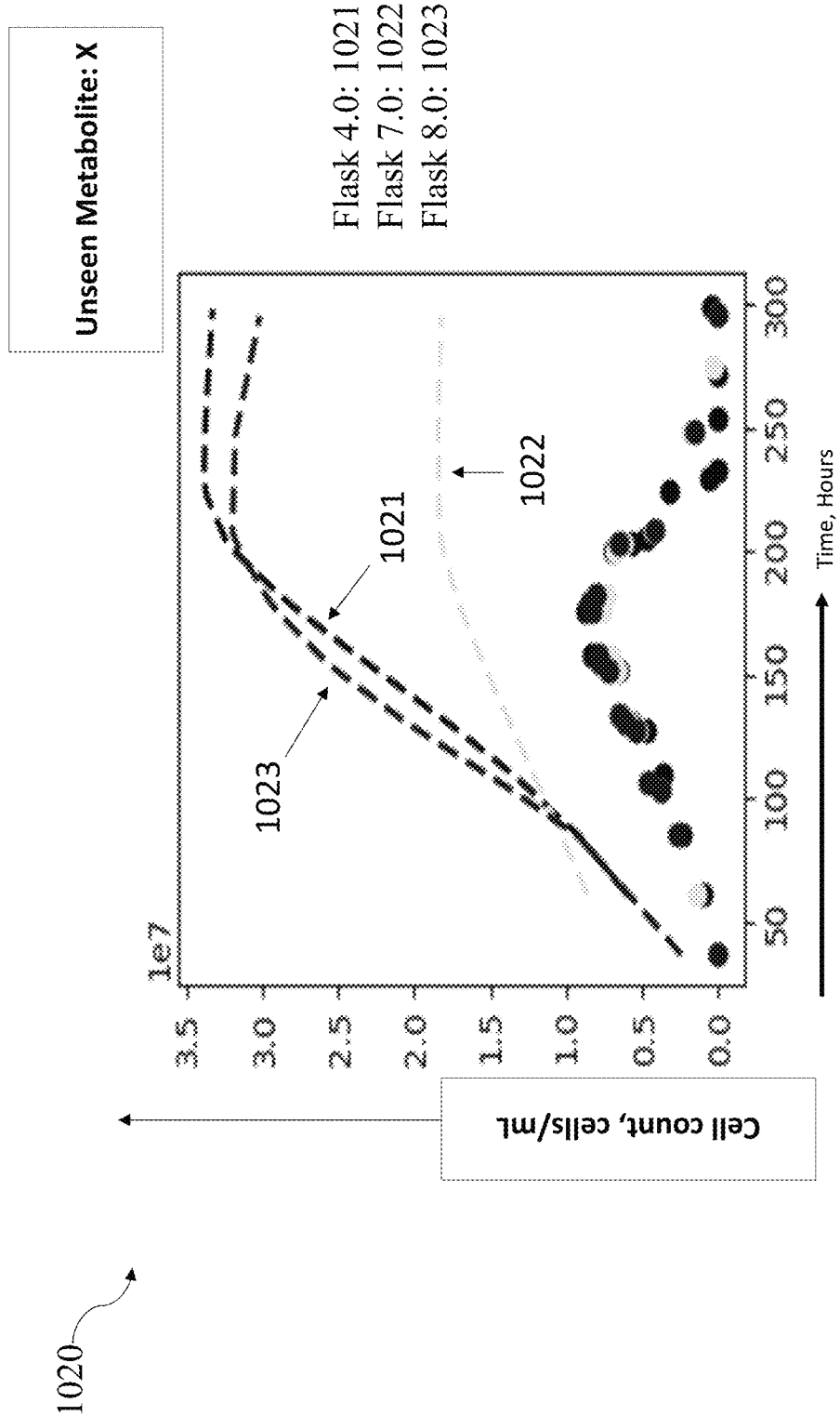
FIG. 10C is a graph illustrating cell count vs. time for various samples, in accordance with aspects of the present disclosure.

FIGS. 10A-10C illustrate compound concentration over time for various samples as determined using the disclosed technology. FIG. 10A illustrates glucose concentration for three flasks over time. FIG. 10B illustrates lactate concentration for three flasks over time. FIG. 10C illustrates cell count vs. time for various samples.

Figure 11A:
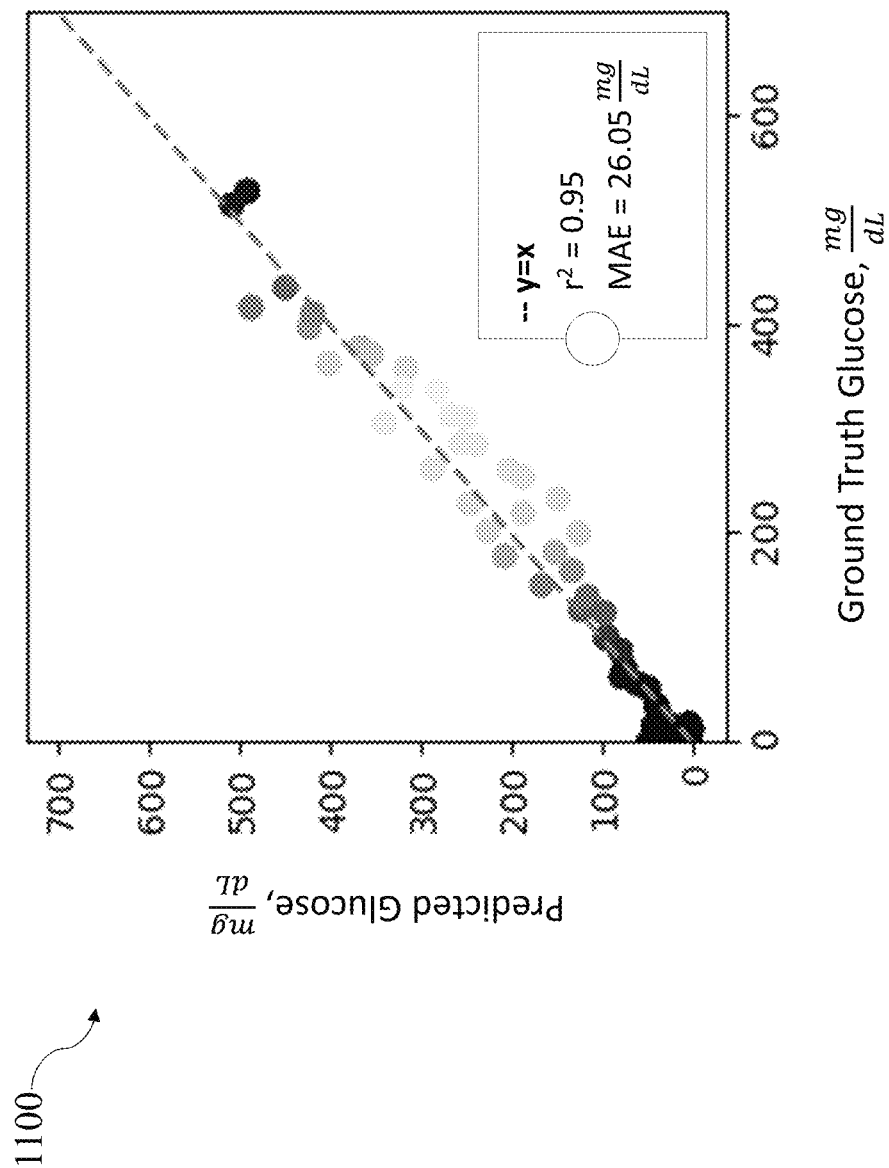
FIG. 11A is a graph illustrating predicted glucose vs. ground truth, in accordance with aspects of the present disclosure.
Figure 11B:
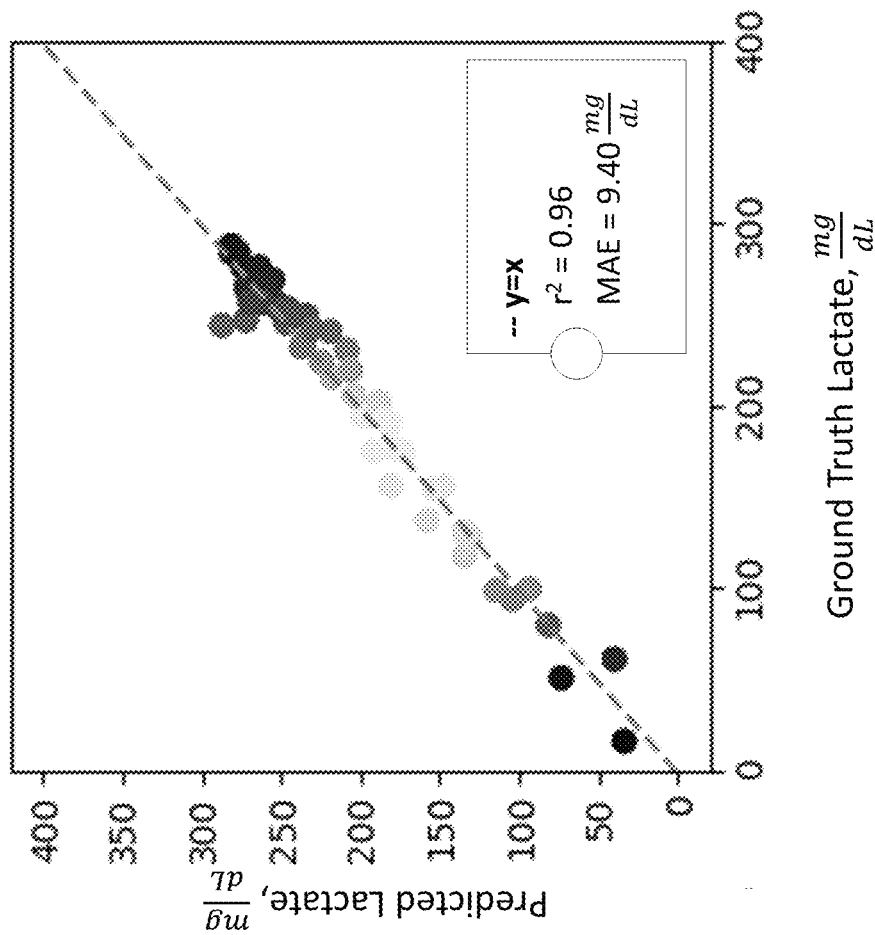
FIG. 11B is a graph illustrating predicted lactate vs. ground truth, in accordance with aspects of the present disclosure.

FIG. 11A illustrates glucose concentration as determined by the system 100 (FIG. 1) vs. ground truth for a bioreactor fluid. FIG. 11B illustrates lactate concentration as determined by the system 100 (FIG. 1) vs. ground truth for a bioreactor fluid.

Figure 12:
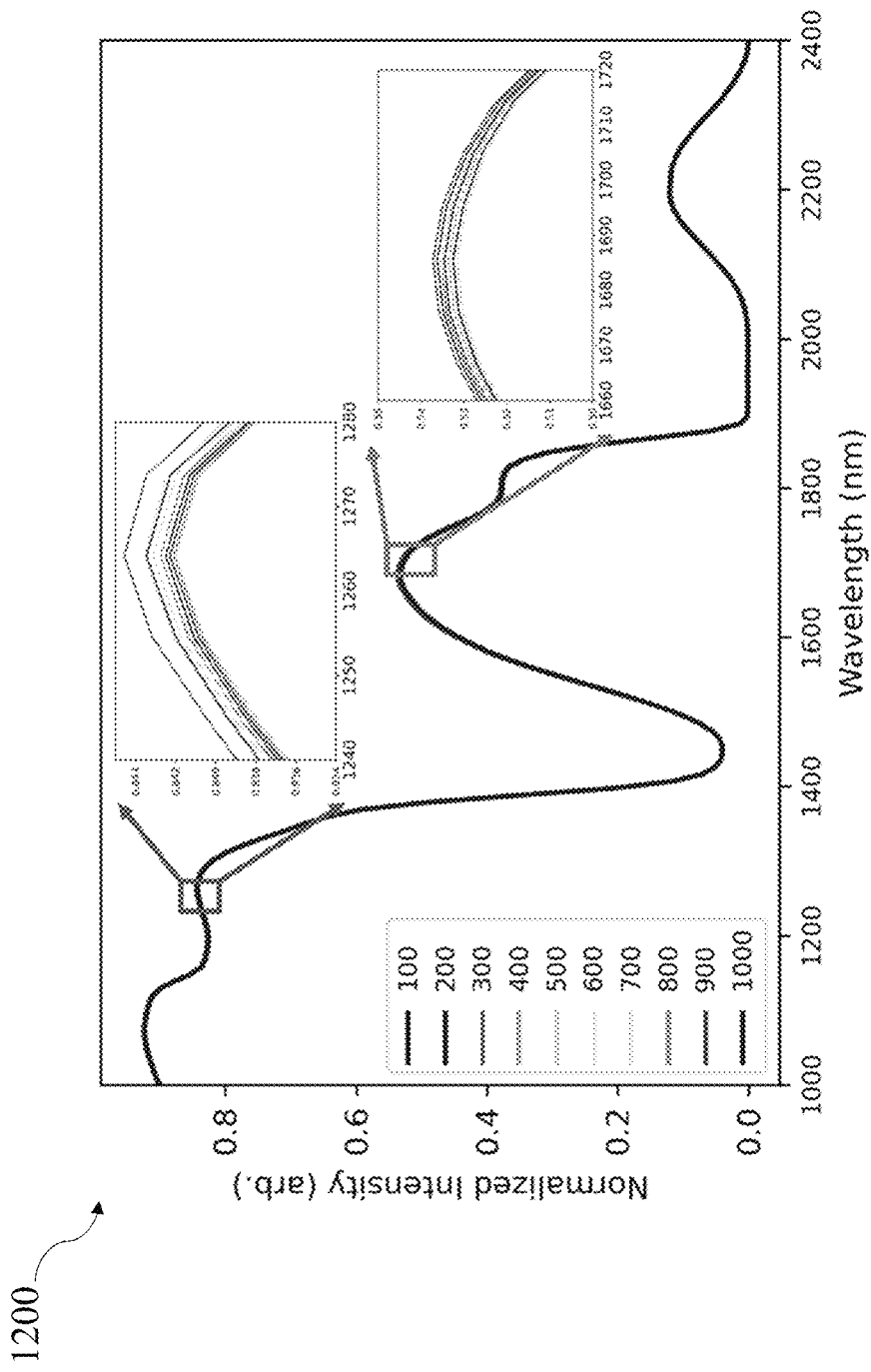
FIG. 12 is a graph illustrating the original spectra of glucose aqueous concentrations, in accordance with aspects of the present disclosure.
Figure 13:
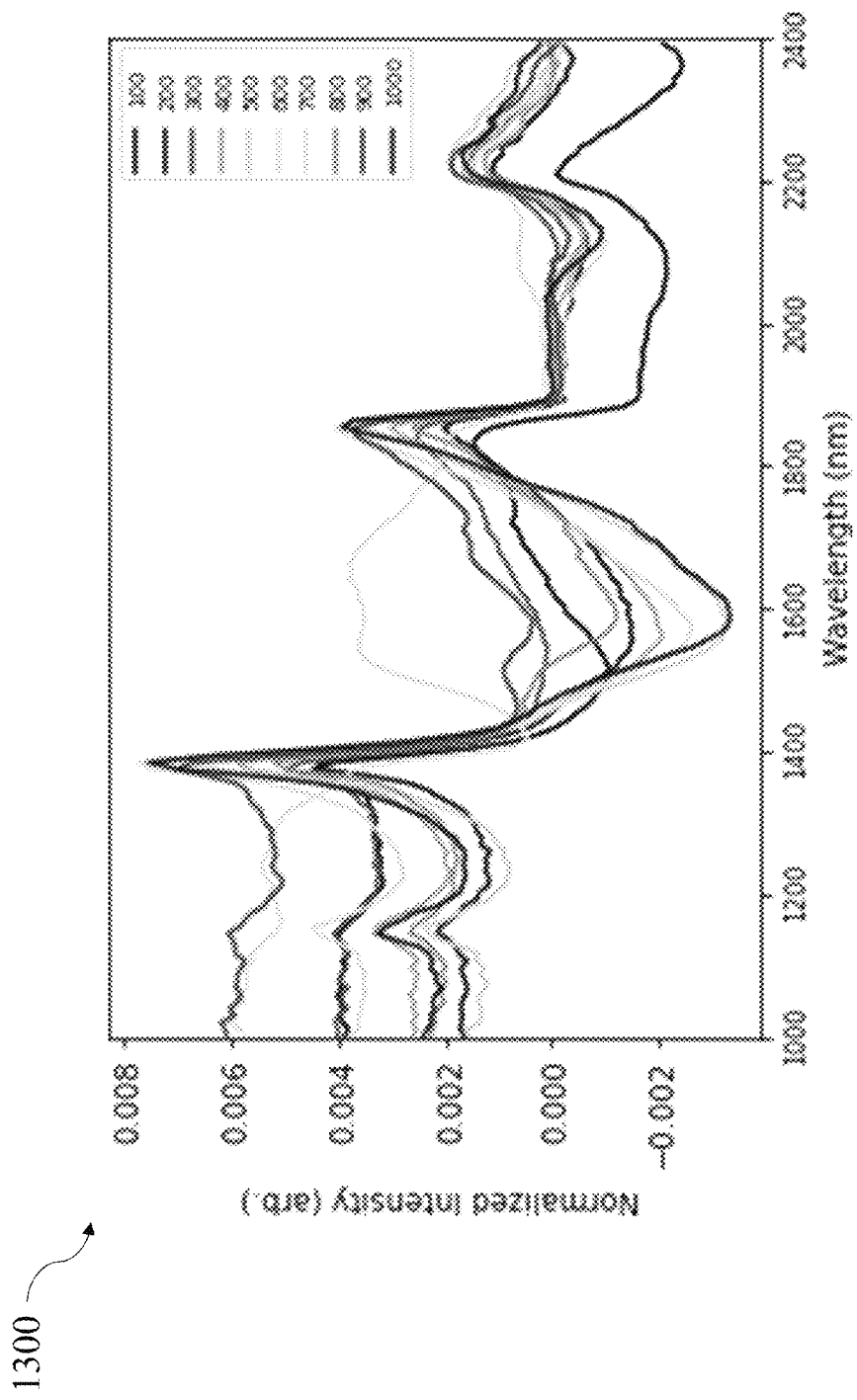
FIG. 13 is a graph illustrating the NIR spectra after reference correction, in accordance with aspects of the present disclosure.

FIG. 12 shows the original spectra of glucose samples. In the NIR range (about 900 to about 2500 nm), water dominates the absorption of the spectrum compared to glucose absorption. The original spectra of glucose with different concentrations are very similar. To extract the glucose concentration from the spectra, water reference correction was done in imaging processing. In FIG. 12, the glucose concentration is in the range from about 100 to about 1000 mg/dL, with about 100 mg/dL interval. The NIR spectra range are between about 1000 nm to about 2400 nm. FIG. 13 illustrates the NIR spectra after reference correction.

Figure 14:
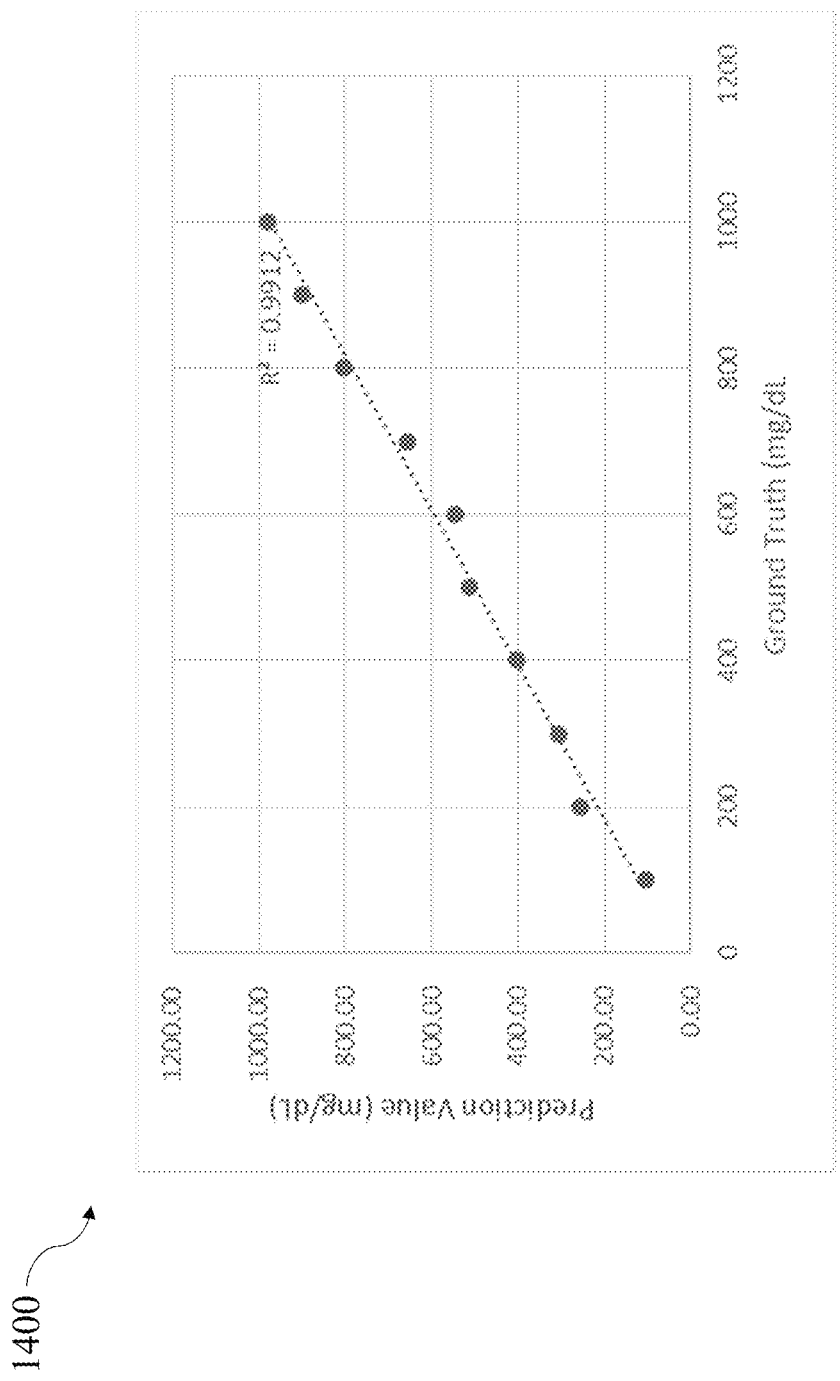
FIG. 14 is a graph illustrating ground truth values plotted against prediction values for leave-one-concentration-out (LOCO) cross-validation, in accordance with aspects of the present disclosure.

FIG. 14 shows the leave-one-concentration-out (LOCO) cross-validation results of a partial least squares regression (PLSR) model, including the prediction value and standard deviation (STD). The prediction value was an average of the prediction of all sample data in the same image. The STD was the standard deviation of all sample data in the same image. Glucose concentrations are between about 100 to about 1000 mg/dL, with about a 100 mg/dL interval. The root-mean-squared error (RMSE) is about 29.60 mg/dL, which is calculated based on the average of the prediction values. The R2 of the PLSR model is about 0.99, illustrating that the prediction and the ground truth values are highly correlated.

Figure 15:
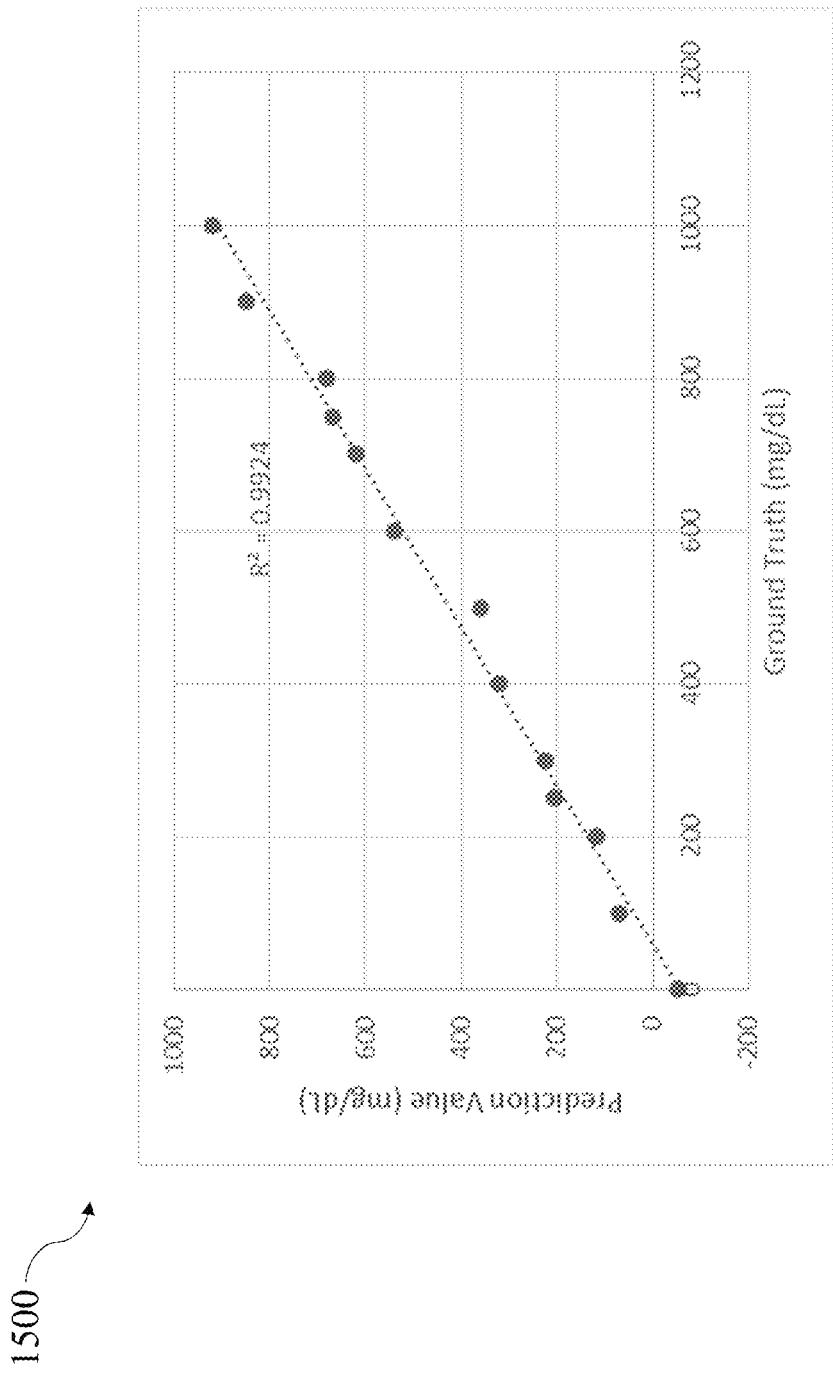
FIG. 15 is a graph illustrating ground truth values plotted against prediction values for different data sets, in accordance with aspects of the present disclosure.

FIG. 15 illustrates the results of the use of the PLSR model to validate the generalization of glucose concentration predictions and predict different glucose samples captured by different people from different dates. The samples in the training data set and testing data set were prepared on different dates to show the repeatability of sample preparation. The R2 and RMSE are about 0.99 and about 79.94 mg/dL, respectively, which illustrate that the PLSR model is still feasible for the prediction of glucose concentration in different data sets with the same concentration range.

Figure 16:
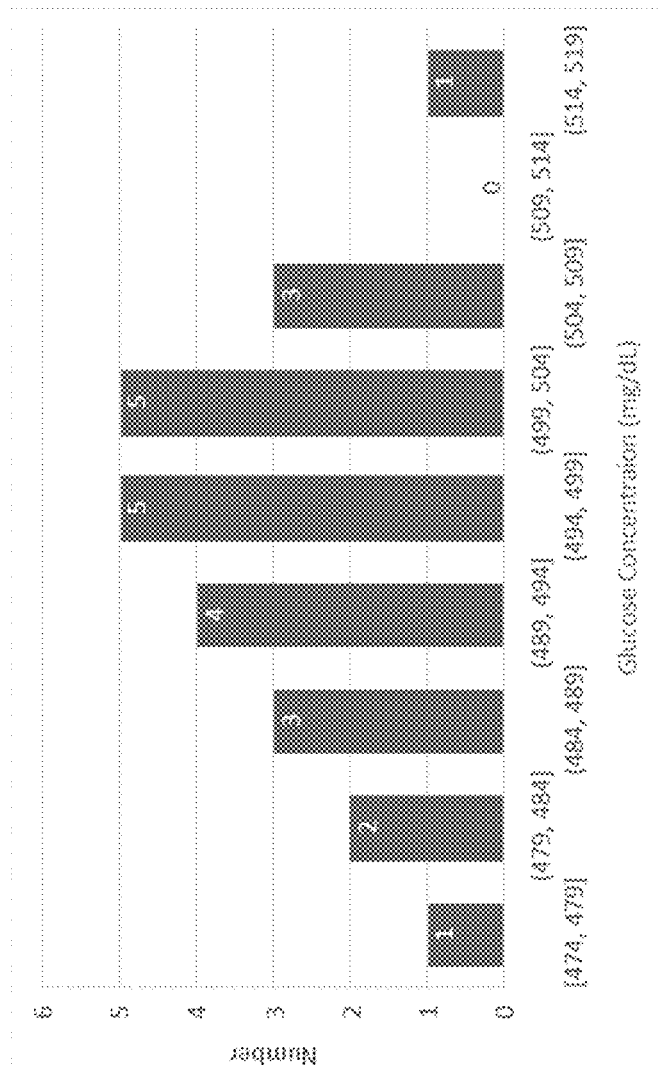
FIG. 16 is a graph illustrating prediction results for different images with the same glucose concentration, in accordance with aspects of the present disclosure.

Referring to FIG. 16, the results of using the PLSR model to validate the repeatability of sample preparation, the stability of the hyperspectral imaging system, and to test a data set of about 24 different images with the same glucose concentration (about 500 mg/dL) are displayed. Most of the predictions are in the range from about 490 to about 510 mg/dL.

Each predicted value is the average prediction from all column average samples from the same image. As seen in the figure, all prediction values are between about 480 to about 515 mg/dL, and the STD is about 10.08 mg/dL. The data shows both the repeatability and the stability of the system.

Figure 17:
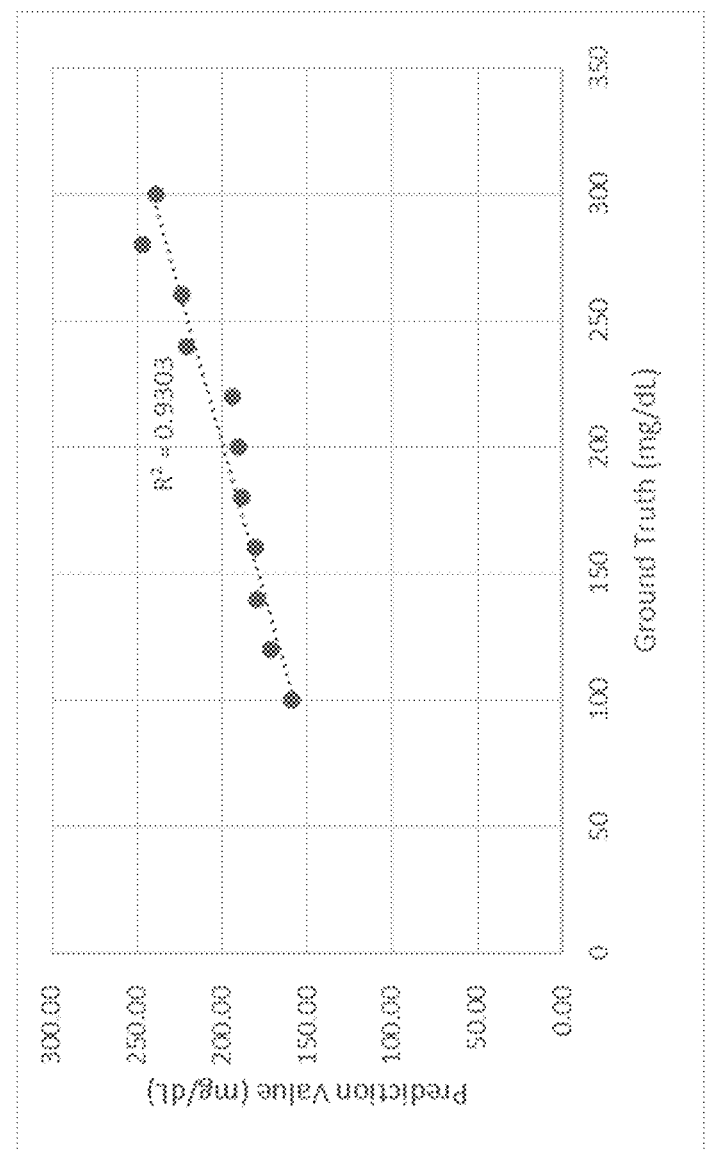
FIG. 17 is a graph illustrating ground truth values plotted against prediction values for higher resolution LOCO cross-validation, in accordance with aspects of the present disclosure.

Referring to FIG. 17, the prediction results of LOCO cross-validation in higher resolution are displayed. Glucose concentrations are between about 100 to about 300 mg/dL, with about 20 mg/dL interval. To evaluate the feasibility of this model for high-resolution glucose concentration predictions, another PLSR model was trained using sample data with minimal concentration increment about 20 mg/dL. LOCO cross-validation was used to validate the PLSR model. The cross-validation results are shown in FIGS. 11A and 11B. Although the RMSE is about 37.5 mg/dL, which is larger than the concentration increment, the predicted R2 is about 0.93. It shows that there is high correlation between the ground truth and the prediction value. However, the accuracy is not high, which can be explained as the lack of training data.

Certain aspects of the present disclosure may include some, all, or none of the above advantages and/or one or more other advantages readily apparent to those skilled in the art from the drawings, descriptions, and claims included herein. Moreover, while specific advantages have been enumerated above, the various aspects of the present disclosure may include all, some, or none of the enumerated advantages and/or other advantages not specifically enumerated above.

The aspects disclosed herein are examples of the disclosure and may be embodied in various forms. For instance, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an aspect," "in aspects," "in various aspects," "in some aspects," or "in other aspects" may each refer to one or more of the same or different example Aspects provided in the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The aspects described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A non-contact system for sensing a concentration of a compound, the system comprising:
   a hyperspectral imaging device configured to capture a hyperspectral image of a fluid;
   a flow cell configured to enable the capturing of the hyperspectral image of the fluid;
   a processor; and
   a memory including instructions stored thereon which, when executed by the processor, cause the system to:
   generate the hyperspectral image of the fluid in the flow cell;
   generate a digital spectral signal based on the hyperspectral image, wherein the digital spectral signal includes one or more columns comprising pixel data;
   provide the digital spectral signal as an input to a machine learning network;
   predict by the machine learning network the concentration of the compound in the fluid;
   compute an average of spectral intensity for each column of one or more columns in the hyperspectral image of the fluid, wherein the pixel data of each column includes a set of pixel intensities representing the spectral intensity at a specific wavelength across a spatial domain of a hyperspectral image;
   generate baseline hyperspectral images of water and baseline hyperspectral images of glucose;
   compute an average of spectral intensity for each column of pixel data in the baseline hyperspectral image of water;
   compute an average of spectral intensity for each column of pixel data in the baseline hyperspectral image of glucose; and
   determine a reference correction, by subtracting, for each column, the average spectral intensity from the baseline water hyperspectral image from the corresponding column average spectral intensity of the baseline glucose hyperspectral image.

2. The system of claim 1, further comprising a pump configured to pump the fluid into the flow cell.

3. The system of claim 2, further comprising a cell media filter configured to filter the fluid prior to the fluid being flowed into the flow cell.

4. The system of claim 1, wherein the machine learning network includes a convolutional neural network.

5. The system of claim 1, wherein the flow cell includes a transparent window configured for imaging the fluid.

6. The system of claim 1, wherein the instructions, when executed by the processor, further cause the system to preprocess the spectral signal to reduce noise, before providing the spectral signal to the machine learning network.

7. The system of claim 1, wherein the instructions, when executed by the processor, further cause the system to establish a relationship between the digital spectral signal and the concentration of the compound based on a ground truth of the concentration of the compound.

8. The system of claim 7, wherein the instructions, when executed by the processor, further cause the system to validate the relationship by leave-one-concentration-out (LOCO) cross validation.

9. The system of claim 1, wherein the hyperspectral imaging device is a short-wave infrared hyperspectral imaging device.

10. A computer-implemented method for sensing a concentration of a compound, the method comprising:
    capturing a hyperspectral image of a fluid within a flow cell by a hyperspectral imaging device;
    generating a spectral signal based on the hyperspectral image captured;
    providing the spectral signal as an input to a machine learning network;
    predicting by the machine learning network the concentration of the compound in the fluid;
    computing an average of spectral intensity for each column of pixel data in the hyperspectral image of the fluid;
    generating baseline hyperspectral images of water and baseline hyperspectral images of glucose;
    computing an average of spectral intensity for each column of pixel data in the baseline hyperspectral image of water;
    computing an average of spectral intensity for each column of pixel data in the baseline hyperspectral image of glucose; and
    determine a reference correction, by subtracting, for each column, the average spectral intensity from the baseline water hyperspectral image from the corresponding column average spectral intensity of the baseline glucose hyperspectral image.

11. The computer-implemented method of claim 10, further comprising pumping a filtered fluid into the flow cell by a pump.

12. The computer-implemented method of claim 11, further comprising filtering the fluid by a cell media filter prior to the flowing of the fluid through the flow cell.

13. The computer-implemented method of claim 10, wherein the machine learning network includes a convolutional neural network.

14. The computer-implemented method of claim 10, wherein the hyperspectral image is captured within a transparent window of the flow cell.

15. The computer-implemented method of claim 10, further comprising preprocessing the spectral signal to reduce noise, before providing the spectral signal to the machine learning network.

16. The computer-implemented method of claim 10, further comprising determining a relationship between the spectral signal and the concentration of the compound based on a ground truth of the concentration of the compound.

17. A non-transitory computer-readable medium storing instructions which, when executed by a processor, cause the processor to perform a computer-implemented method for sensing a concentration of a compound, the method comprising:
    generating a hyperspectral image of a fluid within a flow cell by a hyperspectral imaging device;
    generating a spectral signal based on the hyperspectral image captured;
    providing the digital spectral signal as an input to a machine learning network;
    predicting by the machine learning network a concentration of the compound in the fluid;
    computing an average of spectral intensity for each column of pixel data in the hyperspectral image of the fluid;
    generating baseline hyperspectral images of water and baseline hyperspectral images of glucose;

computing an average of spectral intensity for each column of pixel data in the baseline hyperspectral image of water;
computing an average of spectral intensity for each column of pixel data in the baseline hyperspectral image of glucose; and
determine a reference correction, by subtracting, for each column, the average spectral intensity from the baseline water hyperspectral image from the corresponding column average spectral intensity of the baseline glucose hyperspectral image.

* * * * *